United States Patent [19]

Swanson et al.

[11] Patent Number: 5,657,256

[45] Date of Patent: Aug. 12, 1997

[54] METHOD AND APPARATUS FOR ADMINISTRATION OF COMPUTERIZED ADAPTIVE TESTS

[75] Inventors: Leonard C. Swanson; Martha L. Stocking, both of Hopewell, N.J.

[73] Assignee: Educational Testing Service, Princeton, N.J.

[21] Appl. No.: 249,662

[22] Filed: May 26, 1994

Related U.S. Application Data

[63] Continuation of Ser. No. 830,008, Jan. 31, 1992, abandoned.

[51] Int. Cl.$^6$ .................................................. G05B 13/00
[52] U.S. Cl. ........................ 364/580; 364/554; 364/550
[58] Field of Search .......................... 364/554, 550, 364/580, 419.01–419.09, 419.2; 434/322, 323, 327, 336, 350

[56] References Cited

U.S. PATENT DOCUMENTS

| | | | |
|---|---|---|---|
| 4,870,579 | 9/1989 | Hey | 364/419.2 |
| 4,872,122 | 10/1989 | Altschuler et al. | 364/554 |
| 4,885,712 | 12/1989 | Yamane | 364/550 |
| 5,059,127 | 10/1991 | Lewis et al. | 434/322 |
| 5,103,408 | 4/1992 | Greenberg et al. | 434/323 |
| 5,204,813 | 4/1993 | Samph et al. | 364/419.2 |
| 5,259,766 | 11/1993 | Sack et al. | 364/419.08 |
| 5,261,823 | 11/1993 | Kurokawa | 434/323 |

OTHER PUBLICATIONS

Joseph Kattan, The Tester, Computer Sep. 1984 pp. 58, 62, 64–67.

"Item–presentation controls for multidimensional item pools in computerized adaptive testing" by Thomas J. Thomas, *Behavior Research Methods, Instruments and Computers*, 1990, 22(2), pp. 247–252.

Kent et al., A Comparison of the Relative Efficiency and Validity of Tailored Tests and Conventional Quizzes, Evaluation & Health Professions, Mar. 1987 pp. 68–79.

King, Computer Test Generation Facility to Support Teaching Using the Mastery–Based Formative Test Model, 1990, pp. 145–149.

Dech et al., Reviews of Microcomputer Item Banking Software, Nov. 1985, pp. i–44.

Martha L. Stocking et al., *Research Report, Automated Item Selection Using Item Response Theory*, Educational Testing Service, Feb. 1991.

Frederic M. Lord, *Applications of Item Response Theory To Practical Testing Problems*, Chapter 10, Lawrence Erlbaum Associates, Publishers, 1980, pp. 150–161.

*Primary Examiner*—Emanuel T. Voeltz
*Assistant Examiner*—Hal D. Wachsman

[57] ABSTRACT

A method is disclosed for incorporating into the construction of adaptive tests expert test development practices. The method is an application of a weighted deviations model and an heuristic for automated item selection. Taken into account are the number and complexity of constraints on item selection found in expert test development practice. The method of the present invention incorporates content, overlap, and set constraints on the sequential selection of items as desired properties of the resultant adaptive tests, rather than as strict requirements. Aggregate failures are minimized in the same fashion as in the construction of conventional tests. The extent to which restrictions on item selection are not satisfied is then the result of deficiencies in the item pool, as it is with conventional tests.

19 Claims, 11 Drawing Sheets

METHOD AND APPARATUS FOR ADMINISTRATION OF COMPUTERIZED ADAPTIVE TESTS

This application is a continuation of application Ser. No. 07/830,008 filed Jan. 31, 1992 now abandoned.

BACKGROUND OF THE INVENTION

This invention relates generally to construction of computerized adaptive tests, and in particular to a novel method of utilizing expert test development practices in the construction of adaptive tests.

Conventional multiple-choice tests, which are administered to large numbers of examinees simultaneously by using paper-and-pencil, have been commonly used for educational testing and measurement for many years. Such tests are typically given under standardized conditions, where every examinee takes the same or a parallel test form. This testing strategy represents vastly reduced unit costs over the tests administered individually by examiners that existed during the early part of this century.

However, there remains great interest in restoring some of the advantages of individualized testing. William Turnbull suggested investigations in this direction in 1951 and coined the phrase "tailored testing" to describe this possible paradigm (Lord, 1980, p. 151) (full citations for this and other references are given in the References section below). Possibilities for constructing individualized tests became likely with the advent of Item Response Theory (IRT) (Lord, 1952, 1980) as a psychometric foundation. Beginning in the 1960's, Lord (1970, 1971a) began to explore this application of IRT by investigating various item selection strategies borrowed from the bioassay field. Later work by Lord (1977, 1980) and Weiss (1976, 1978) laid the foundation for the application of adaptive testing as an alternative to conventional testing.

Adaptive tests are tests in which items are selected to be appropriate for the examinee; the test adapts to the examinee. All but a few proposed designs, for example, Lord's (1971b) flexilevel test, have assumed that items would be chosen and administered to examinees on a computer, thus the term computerized adaptive testing, or CAT. Adaptive testing using multiple-choice items has received increasing attention as a practical alternative to paper-and-pencil tests as the cost of modern low-cost computing technology has declined. The Department of Defense has seriously considered its introduction for the Armed Services Vocational Aptitude Battery (CAT-ASVAB) (Wainer, et al., 1990); large testing organizations have explored and implemented CAT, e.g. the implementation of adaptive testing by Educational Testing Service and the College Entrance Examination Board for the College Placement Tests (CPTs) program (College Board, 1990); certification and licensure organizations are paying increased attention to adaptive testing as a viable alternative (Zara, 1990).

Conventional Test Construction

Conventional test construction—the construction of multiple-choice tests for paper-and-pencil administration—is time consuming and expensive. Aside from the costs of writing and editing items, items must be assembled into test forms. In typical contexts found in public and private testing organizations, a goal is to construct the most efficient test possible for some measurement purpose. This requires that item selection be subject to various rules that govern whether or not an item may be included in a test form. Such rules are frequently called test specifications and constitute a set of constraints on the selection of items.

These constraints can be considered as falling into four separate categories: (1) constraints that focus on some intrinsic property of an item, (2) constraints that focus on item features in relation to all other candidate items, (3) constraints that focus on item features in relation to a subset of all other candidate items, and (4) constraints on the statistical properties of items as derived from pretesting.

(1) Constraints on Intrinsic Item Properties

Tests built for a specific measurement purpose typically have explicit constraints on item content. For example, the test specifications for a test in mathematics may specify the number or percentage of items on arithmetic, algebra, and geometry. These specifications may be further elaborated by a specification that a certain percentage of arithmetic items involve operations with whole numbers, a certain percentage involve fractions, a certain percentage involve decimals. Likewise, a percentage might be specified for algebra items involving real numbers as opposed to symbolic representations of numbers, and so forth. It is not unusual for fairly extensive test specifications to identify numerous content categories and subcategories of items and their required percentages or numbers.

In addition to constraints explicitly addressing item content, constraints are typically given for other features intrinsic to an item that are not directly content related. For example, restrictions may be placed on the percentage of sentence completion items that contain one blank as opposed to two blanks, and two blanks as opposed to three blanks. These types of constraints treat the item type or the appearance of the item to the examinee. A second type of constraint not directly related to content may address the reference of the item to certain groups in the population at large, as when, for example, an item with a science content has an incidental reference to a minority or female scientist. Such constraints may also seek to minimize or remove the use of items that contain incidental references that might appear to favor social class or wealth, for example, items dealing with country clubs, golf, polo, etc. These types of constraints are frequently referred to as sensitivity constraints and test specifications frequently are designed to provide a balance of such references, or perhaps an exclusion of such references, in the interest of test fairness.

In addition to these more formal constraints on various features of items, there are frequently other less formal constraints that have developed as part of general good test construction practices for tests of this type. These constraints may seek to make sure that the location of the correct answer appears in random (or nearly random) locations throughout a test, may seek to encourage variety in items by restricting the contribution of items written by one item writer, and so forth.

(2) Constraints That Focus on Item Features in Relation to All Other Candidate Items It is evident that a test must not include an item that reveals the answer to another item. Wainer and Kiley (1987) describe this as cross-information. Kingsbury and Zara (1991) also describe this kind of constraint. In addition to giving direct information about the correct answer to another item, an item can overlap with other items in more subtle ways. Items may test the same or nearly the same point, but appear to be different, as in an item dealing with the sine of 90 degrees and the sine of 450 degrees. If the point being tested is sufficiently similar, then one item is redundant and should not be included in the test because it provides no additional information about an examinee.

Items may also overlap with each other in features that are incidental to the purpose of the item. For example, two reading comprehension passages may both about science and both may contain incidental references to female minority scientists. It is unlikely that test specialists would seek to include both passages in a general test of reading comprehension. We refer to items that give away answers to other items, items that test the same point as others, and items that have similar incidental features as exhibiting content overlap which must be constrained by the test specifications.

Test specialists who construct verbal tests or test sections involving discrete verbal items, that is, items that are not associated with a reading passage, are concerned that test specifications control a second kind of overlap, here referred to as word overlap. The concern is that relatively uncommon words used in any of the incorrect answer choices should not appear more than once in a test or test section. To do so is to doubly disadvantage those examinees with more limited vocabularies in a manner that is extraneous to the purposes of the test. For example, an incorrect answer choice for a synonym item may be the word "hegira." Test specialists would not want the word "hegira" to then appear in, for example, an incorrect answer choice for a verbal analogy item to be included in the same test.

(3) Constraints On Item Features in Relation to a Subset of All Other Candidate Items Some items are related to each other through their relationship to common stimulus material. This occurs when a number of items are based on a common reading passage in a verbal test, or when a number of items are based on a common graph or table or figure in a mathematics test. If test specifications dictate the inclusion of the common stimulus material, then some set of items associated with that material is also included in the test. It may be that there are more items available in a set than need to be included in the test, in which case the test specifications dictate that some subset of the available items be included that best satisfy other constraints or test specifications.

Some items are related to each other not through common stimulus material, but rather through some other feature such as having common directions. For example, a verbal test might include synonyms and antonyms, and it might be confusing to examinees if such items were intermixed. Test specifications typically constrain item ordering so that items with the same directions appear together.

Whether items form groups based on common stimulus material or common directions or some other feature, we will describe these groups as item sets with the intended implication that items belonging to a set may not be intermixed with other items not belonging to the same set.

(4) Constraints On the Statistical Properties of Items

Information about the statistical behavior of items may be available from the pretesting of items, that is, the administration of these items to examinees who are similar to the target group of examinees. Test specifications typically constrain the selection of items based on their statistical behavior in order to construct test forms that have the desired measurement properties. If the goal of the measurement is to create parallel editions of the same test, these desired measurement properties are usually specified in terms of the measurement properties of previous test editions. If the goal of the measurement is to create a new test for, say, the awarding of a scholarship or to assess basic skills, test specifications will constrain the selection of items to hard items or easy items respectively.

These constraints typically take the form of specifying some target aggregation of statistical properties, where the statistical properties may be based on conventional difficulty and discrimination or the counterpart characteristics of items found in IRT. If IRT item characteristics are employed, the target might be some combination of item characteristics, as for example, target test information functions. If conventional item statistics are used, the target aggregation is usually specified in terms of frequency distributions of item difficulties and discriminations.

Adaptive Test Construction

Early Monte Carlo investigations of adaptive testing algorithms concentrated predominantly on the psychometric aspects of test construction (see, for example, Lord, 1970, 1971a, 1971b). Such investigations eventually led to IRT-based algorithms that were fast, efficient, and psychometrically sound. A review of the most frequently used algorithms is given in Wainer, et al. (1990, Chapter 5) and Lord (1980, Chapter 9). The fundamental philosophy underlying these algorithms of the prior art is as follows:

1) An initial item is chosen on some basis and administered to the examinee.

2) Based on the examinee's response to the first item, a second item is chosen and administered. Based on the examinee's response to the first two items, a third item is chosen and administered, etc. In typical paradigms, the examinee's responses to previous items are reflected in an estimate of proficiency that is updated after each new item response is made.

3) The selection of items continues, with the proficiency estimate updated after each item response, until some stopping criterion is met.

4) The examinee's final score is the proficiency estimate after all items are administered.

When practical implementation became a possibility, if not yet a reality, researchers began to address the incorporation of good test construction practices as well as psychometric considerations into the selection of items in adaptive testing.

One of the first to do so was Lord (1977) in his Broad Range Tailored Test of Verbal Ability. The item pool for this adaptive test consisted of five different types of discrete verbal items. For purposes of comparability or parallelism of adaptive tests, some mechanism is necessary to prevent, for example, one examinee's adaptive test from containing items of only one type and another examinee's test containing only items of a different type. To exert this control, the sequence of item types is specified in advance, for example, the first item administered must be of type A, the second through fifth items must be of type B, and so forth. In this maximum-likelihood-based adaptive test, Lord selects items for administration based on maximum item information for items of the appropriate prespecified type in the sequence at an examinee's estimated level of ability.

In an attempt to control more item features, the approach of specifying the sequence of item types in advance can become much more elaborate, as in the CPTs (Ward, 1988) where the number of item types is as large as 10 or 15. In this context, items are classified as to type predominantly on the basis of intrinsic item features discussed previously. The same kind of control is used in the CAT-ASVAB (Segall, 1987). This type of content control has been called a constrained CAT (C-CAT) by Kingsbury and Zara (1989).

A major disadvantage of this approach of the prior art is that it assumes that item features of interest partition the available item pool into mutually exclusive subsets. Given the number of intrinsic item features that may be of interest to test specialists, the number of mutually exclusive partitions can be very large and the number of items in each partition can become quite small. For example, consider items that can be classified with respect to only 10 different item properties, each property having only two levels. The number of mutually exclusive partitions of such items is $2^{10}-1$, or over 1000 partitions. Even with a large item pool, the number of items in each mutually exclusive partition can become quite small.

Nevertheless, such an approach would be possible except for the fact that no effort is made with this type of control to incorporate considerations of overlap or sets of items. These considerations could in theory be accomplished by further partitioning by overlap group and by set, but the number of partitions would then become enormous.

Wainer and Kiely (1987) and Wainer, et al. (1990) hypothesize that the use of testlets can overcome these problems. Wainer and Kiely define a testlet as a group of items related to a single content area that is developed as a unit and contains a fixed number of predetermined paths that an examinee may follow (1987, p. 190). They suggest that an adaptive test can be constructed from testlets by using the testlet rather than an item as the branching point. Because the number of paths through a fairly small pool of testlets is relatively small, they further suggest that test specialists could examine all possible paths. They hypothesize that this would enable test specialists to enforce constraints on intrinsic item features, overlap, and item sets in the same manner as is currently done with conventional tests.

Kingsbury and Zara (1991) investigated the measurement efficiency of the testlet approach to adaptive testing as compared to the C-CAT approach. Their results show that the testlet approach could require from 4 to 10 times the test length of the C-CAT approach to achieve the same level of precision. Aside from measurement concerns, the testlet approach rests on the idea that the pool of available items can be easily subdivided into mutually exclusive subsets (testlets), also a disadvantage of the C-CAT approach.

The testlet approach addresses overlap concerns within a testlet because the number of items in a testlet is small. It prevents overlap across testlets through the mechanism of a manual examination of the paths through the testlet pool. If the number of paths is large, this approach becomes difficult to implement.

A distinct advantage of the testlet approach over the C-CAT approach is the facility to impose constraints on the selection of sets of items related through common stimulus material or some other common feature. A single reading comprehension passage and its associated items could be defined as a testlet, for example, as long as the items to be chosen for that passage are fixed in advance as part of the testlet construction effort. The C-CAT approach can not be easily modified to handle this type of constraint.

Binary Programming Model

Unlike prior methods of adaptive testing, the present invention is based on a mathematical model formatted as a binary programming model. All of the test specifications discussed above can be conveniently expressed mathematically as linear constraints, in the tradition of linear programming. For example, a specification such as "select at least two but no more than 5 geometry items" takes the form $$2 \leq x \leq 5$$

where x is the number of selected items having the property "geometry." Conformance to a specified frequency distribution of item difficulties takes the form of upper and lower bounds on the number of selected items falling into each specified item difficulty range.

Similarly, conformance to a target test information function takes the form of upper and lower bounds on the sum of the individual item information functions at selected ability levels. This is based on the premise that it is adequate to consider the test information function at discrete ability levels. This is a reasonable assumption given that test information functions are typically relatively smooth and that ability levels can be chosen to be arbitrarily close to each other (van der Linden, 1987).

A typical formulation of a binary programing model has the following mathematical form. Let $i=1, \ldots, N$ index the items in the pool, and let $x_i$ denote the decision variable that determines whether item i is included in ($x_i=1$) or excluded from ($x_i=0$) the test. Let $j=1, \ldots, J$ index the item properties associated with the non-psychometric constraints, let $L_j$ and $U_j$ be the lower and upper bounds (which may be equal) respectively on the number of items in the test having each property, and let $a_{ij}$ be 1 if item i has property j and 0 if it does not. Then the model for a test of fixed length n is specified as:

$$\text{Minimize (or maximize) } z \quad (1)$$
Subject to $$\sum_{i=1}^{N} x_i = n, \quad (2)$$

$$\sum_{i=1}^{N} a_{ij}x_i \geq L_j, j=1, \ldots, J, \quad (3)$$

$$\sum_{i=1}^{N} a_{ij}x_i \leq U_j, j=1, \ldots, J, \quad (4)$$

$$x_i \in \{0,1\}, i=1, \ldots, N. \quad (5)$$

Note that equation (2) fixes the test length, while equations (3) and (4) express the non-psychometric constraints as lower and upper bounds on the number of items in the test with the specified properties.

The objective function, z, can take on several possible forms (see van der Linden and Boekkooi-Timminga, 1989, table 3). It typically maximizes conformance to the psychometric constraints. Examples include maximizing absolute test information; minimizing the sum of the positive deviations from the target test information; or minimizing the largest positive deviation from the target. Models that minimize the maximum deviation from an absolute or relative target are referred to as "minimax" models. The objective function can also take the form of minimizing test length, as in Theunissen (1985), or minimizing other characteristics of the test, such as administration time, frequency of item administration, and so forth. Finally, z could be a dummy variable that is simply used to cast the problem into a linear programming framework. Boekkooi-Timminga (1989) provides a thorough discussion of several of these alternatives.

A Model for Solving Large Problems

If the binary programming model expressed in equations (1) through (5) is feasible (that is, has an integer solution), then it can be solved using standard mixed integer linear programming (MILP) algorithms (see, for example, Nemhauser & Wolsey, 1988). Several such models have been proposed and investigated using these methods. Considerable attention has also been devoted to methods of speeding up the MILP procedure (see, for example, Adema, 1988, and Boekkooi-Timminga, 1989).

Binary programming models, together with various procedures and heuristics for solving them, have been successful in solving many test construction problems. However, it is not always the case that the model (1) through (5) has a feasible solution. This may occur because one or more of the constraints in equation (3) or (4) is difficult or impossible to satisfy, or simply because the item pool is not sufficiently rich to satisfy all of the constraints simultaneously. In general, the binary programming model is increasingly more likely to be infeasible when the number of constraints is large because of the complexity of the interaction of constraints.

Studies reported in the literature have generally dealt with relatively small problems, with pool sizes on the order of 1000 or less and numbers of constraints typically less than 50. By contrast, we typically encounter pool sizes from 300 to 5000 or more, and numbers of constraints from 50 to 300. Moreover, many if not most of these constraints are not mutually exclusive, so that it is not possible to use them to partition the pool into mutually independent subsets. We have found that problems of this size, with this degree of constraint interaction, greatly increase the likelihood that the model (1) through (5) will not have a feasible solution.

Heuristic procedures for solving the model often resolve the feasibility problem. For example, Adema (1988) derives a relaxed linear solution by removing equation (5). Decision variables with large and small reduced costs are then set to 0 and 1, respectively, or the first integer solution arbitrarily close to the relaxed solution is accepted. Various techniques for rounding the decision variables from the relaxed solution have also been investigated (van der Linden and Boekkooi-Timminga, 1989). Heuristics such as these were designed to reduce computer time, but in many cases they will also ensure a feasible (if not optimal) solution to the binary model if there is a feasible solution to the relaxed linear model.

It is therefore an object of the present invention to provide a method of constructing adaptive tests which implements the aforementioned test specification constraints in a binary programming model which provides for automated item selection.

SUMMARY OF THE INVENTION

In accordance with these and other objects, the foundation of the method of the present invention for incorporating expert test construction practices in the construction of adaptive tests is the application of a novel weighted deviations model and an algorithm for automated item selection. This weighted deviations model and algorithm were developed in the context of conventional test assembly paradigms that have been previously proposed. Typically, these paradigms employ a combination of IRT, modern computers, and linear programming models. Exemplars of other such paradigms include Theunissen (1985), van der Linden (1987), van der Linden and Boekkooi-Timmiga (1989), and Ackerman (1989). The weighted deviations algorithm was developed and tried out on many conventional test construction problems using real item pools (Stocking, Swanson, and Pearlman, 1991) and found to be completely satisfactory in its capability of handling constraints on intrinsic item features. The handling of constraints on overlap (both content and word overlap) and constraints on item sets with common directions are additions to the weighted deviations algorithm for its application to adaptive testing, although such features would be useful in the context of conventional test assembly as well.

The success of the new method of the present invention rests on the fact that it can incorporate content, overlap, and set constraints on the sequential selection of items as desired properties of the resultant adaptive tests, rather than as strict requirements. At the same time, the present invention minimizes aggregate failures in the same fashion as in the construction of conventional tests. The extent to which restrictions on item selection are not satisfied is then the result of deficiencies in the item pool, as it is with conventional tests. With this new method, adaptive test construction is brought up to the same high standards already established for conventional tests.

The underlying philosophy of the model is as follows: test assembly is less concerned with optimizing some function of the items selected (for example, maximizing test information or minimizing test length) or even meeting all of the constraints of interest, than it is with coming as close as possible to meeting all constraints simultaneously. Thus, constraints (including statistical constraints) are thought of more as desired properties than as true constraints. This approach recognizes the possibility of constructing a test that may lack all of the desired properties, but emphasizes the minimization of aggregate failures. Moreover, the model provides for the possibility that not all constraints are equally important to the test designer by incorporating explicit relative weights as part of the modeling of constraints. If the item pool is rich enough in items with intrinsic item features of interest, then the resultant test selected by the weighted deviations algorithm, whether adaptive or conventional, will have all of the desired properties.

In this context, the constraints are formulated as bounds on the number of items having specified properties. The constraints need not, and in general will not, divide the item pool into mutually exclusive subsets. Rather, each item can have many different features satisfying many different constraints. Statistical constraints on item selection are treated just like any other constraints. The algorithm seeks to minimize the weighted sum of positive deviations from these constraints. It employs a successive item selection procedure that makes it especially appropriate to a paradigm such as adaptive testing.

The present invention provides, through an augmented item selection model and algorithm, a mechanism for selecting items in adaptive testing that mirrors as closely as possible the considerations that govern the assembly of conventional tests. The next item administered in an adaptive test is the item that simultaneously (1) is the most informative item at an examinee's estimated ability level, and (2) contributes the most to the satisfaction of all other constraints in addition to the constraint on item information. At the same time, we require that the item (3) does not appear in an overlap group containing an item already administered, and (4) is in the current block (if we are in a block), starts a new block, or is in no block.

DESCRIPTION OF THE PREFERRED EMBODIMENT

Figure 1A:
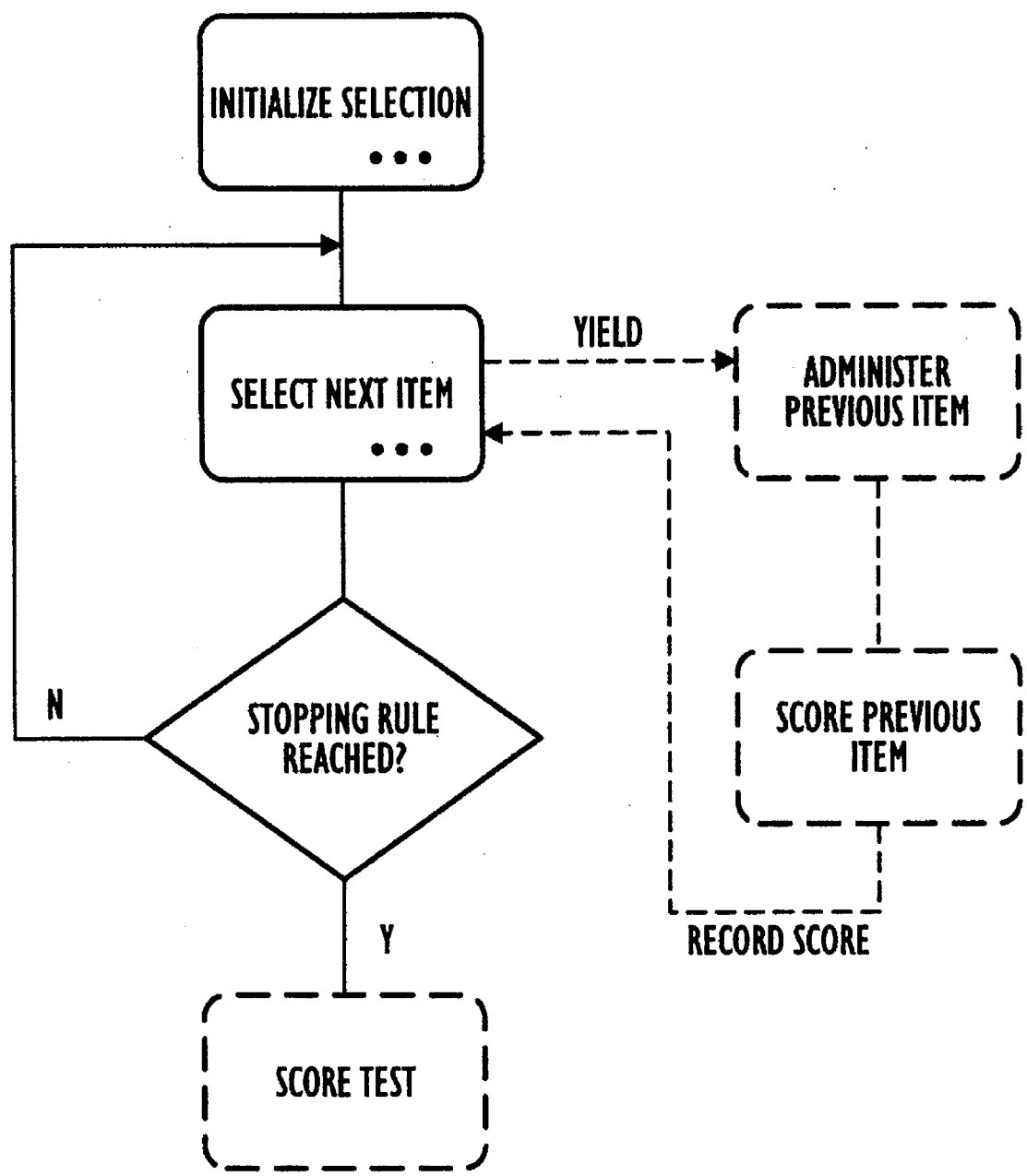
FIG. 1(a) is a flowchart of the item selection environment of a preferred embodiment of the present invention.

The method of the present invention is implemented in the preferred embodiment by minimizing the weighted sum of positive deviations from the constraints. We retain the basic principle of the binary programming model, but test specifications are now moved from the constraints, e.g., equations (3) and (4), to the objective function. Specifically, equation (3) is replaced by $$\sum_{i=1}^{N} a_{ij}x_i + d_{L_j} - e_{L_j} = L_j, j = 1, \ldots, J \quad (6)$$

where $d_{L_j}$ and $e_{L_j}$ are the positive and negative portions the deviations from the lower bounds, respectively. Similarly, equation (4) is replaced by $$\sum_{i=1}^{N} a_{ij}x_i - d_{U_j} + e_{U_j} = U_j, j = 1, \ldots, J \quad (7)$$

where $d_{U_j}$ and $e_{U_j}$ are the positive and negative portions of the deviations from the upper bounds, respectively. The objective function then becomes to minimize $$\sum_{j=1}^{J} w_j d_{L_j} + \sum_{j=1}^{J} w_j d_{U_j} \quad (8)$$

where $w_j$ is the weight assigned to constraint j.

For convenience of terminology we will continue to refer to constraints in the sense in which test specialists think of them, recognizing that they are not constraints in the mathematical sense of binary programming. The equations given above reflect the mathematical formalism by which the test specialist's constraints are transferred to the objective function.

For IRT-based tests, we consider conformance to a target test information function as a set of constraints like any other. This takes the following mathematical form. Let k=1, ..., K be points on the ability scale, θ, at which the test specialist wishes to constrain the test information function, for example, points between −3.0 and 3.0. Let $I_i(\theta_k)$ be the item information for item i at $\theta_k$. Let $I_L(\theta_k)$ and $I_U(\theta_k)$ be the lower and upper bounds, respectively, on test information at $\theta_k$. Then conformance to the target test information is expressed as the two equations $$\sum_{i=1}^{N} I_i(\theta_k) + d_{L_k} - e_{L_k} = I_L(\theta_k), k=1, \ldots, K, \quad (9)$$

$$\sum_{i=1}^{N} I_i(\theta_k) - d_{U_k} + e_{U_k} = I_U(\theta_k), k=1, \ldots, K. \quad (10)$$

Note that these equations are simply special forms of equations (6) and (7), respectively. For test information constraints the $a_{ij}$ become item information at points on the ability scale, instead of 0 or 1, and the $L_j$ and $U_j$ become lower and upper bounds on information, rather than bounds on the number of items having a specified property. Thus, while the non-psychometric constraints are formulated as bounds on the number of items having specified properties, the target test information function constraint is expressed as bounds on information at a desired set of points on the ability scale.

Note also that we are placing a band on test information rather than simply maximizing it. There are two reasons for this. First, in many cases tests are required to be roughly parallel over time, so that one edition of the test does not measure differently than another. To accomplish this we need to control not only the minimum information provided by the test, but also its maximum. Second, and more importantly, if we placed no limit on information then the item selection process would tend to choose the more informative items and exhaust the pool of these items. The psychometric quality of tests produced from a pool would thereby decrease over time (Boekkooi-Timminga, 1989). The mechanism for dealing with both of these problems is to establish both upper and lower bounds on information.

An additional consideration in formulating a model appropriate to large item selection problems is dealing with common stimulus item sets, that is, a group of items related to each other through a common stimulus. Examples include a reading passage or a chart or graph, together with a set of questions about the common stimulus. Test specialists will often have constraints that apply to the set itself (or any subset of the set); for example, "select at most one set on medieval literature." In addition, they will often select only a subset of the set to be included in a particular test (if the set is included at all). The items in that subset must, along with all other items included in the test, conform to the global psychometric and non-psychometric constraints.

If the test specialist has the option of selecting a subset, as opposed to the full set, then the number of possibilities to be considered is large. In particular, if a set has n items then the number of possibilities to be considered is $$\sum_{k=1}^{n} C_{n,k},$$

where $C_{n,k}$ is the number of combinations of n taken k at a time (in practice test specialists avoid sets with one item, so the sum is more typically from 2 to n). As an example, for a 10 item set the test specialist would have to consider over 1000 possibilities ($C_{10,2}+C_{10,3}+\ldots+C_{10,10}$).

Item sets can be represented in the model by redefining the item pool to include all enumerated subsets as well as the discrete items (items not associated with any set). Thus, N becomes the number of discrete items plus enumerated subsets, $x_i$ indicates whether the $i^{th}$ item/subset in the pool is included in the test, and $a_{ij}$ indicates the presence of property j (for non-psychometric constraints) or the item/subset information (for IRT-based target constraints) for the $i^{th}$ item/subset in the pool. Note that for the target constraints, if i represents a subset then $a_{ij}$ is the sum of the item information over the items in that subset.

Given this redefinition of the pool, the test length is no longer the sum of the $x_i$'s since some of the i's represent subsets with more than one item. For convenience we define another variable, g, indexed on the pool, and set $g_i$ to the number of items in the subset if i represents a subset, or to 1 if i represents a discrete item.

A final complication of item sets is that it would be illogical to select more than one subset from a given set. To control for this we need to define an additional constraint (in the strict binary programming sense) that limits the selection to at most one subset of any set. Let s=1, ..., S index the item sets in the original pool, and let $b_{is}$ be 1 if item/subset i is a subset of set s and 0 otherwise. Then the additional constraint is specified as $$\sum_{i=1}^{N} b_{is} x_i \leq 1, s=1, \ldots, S, \qquad (11)$$

In summary, the complete specification for the new model is as follows:

Minimize $$\sum_{j=1}^{J} w_j d_{L_j} + \sum_{j=1}^{J} w_j d_{U_j} \qquad (12)$$

Subject to $$\sum_{i=1}^{N} g_i x_i = n, \qquad (13)$$

$$\sum_{i=1}^{N} a_{ij} x_i + d_{L_j} - e_{L_j} = L_j, j=1, \ldots, J, \qquad (14)$$

$$\sum_{i=1}^{N} a_{ij} x_i - d_{U_j} + e_{U_j} = U_j, j=1, \ldots, J, \qquad (15)$$

$$\sum_{i=1}^{N} b_{is} x_i \leq 1, s=1, \ldots, S, \qquad (16)$$

$$d_{L_j}, d_{U_j}, e_{U_j} \geq 0, j=1, \ldots, J, \qquad (17)$$

$$x_i \in \{0,1\}, i=1, \ldots, N. \qquad (18)$$

We refer to the model expressed in equations (12) through (18) as the weighted deviations model.

This model was investigated by constructing tests using several actual item pools and test specifications. Many of the cases involved relatively large item pools, and all of the cases involved large numbers of constraints (in the test specialist's sense). All data used was taken from actual test assemblies for operating testing programs. The results are presented in a following section.

An Heuristic for Solving the Model

The weighted deviations model presented in equations (12) through (18) is a binary programming problem and therefore, as noted earlier, can be solved using standard mixed integer linear programming algorithms. These algorithms will in general produce the best possible solution to the problem, in the sense of the optimal value for the objective function. However, very large test construction problems are difficult to solve using MILP algorithms. They often require considerable amounts of computer time and, more importantly, sometimes exceed the limits of MILP implementations. The size of a linear programming model is often measured in terms of the number of variables (that is, decision variables) and the number of equations (constraints and objective function) in the model. As will be seen shortly, we have encountered problems involving as many as 140,000 variables and almost 400 equations; such problems exceed the limits of linear programming implementations for microcomputers.

Heuristic solutions to binary programming problems, while often suboptimal, overcome these difficulties. While any number of heuristics might be considered, the objective function for the weighted deviations model itself suggests a very intuitive one: select items in such a way that the weighted sum of the positive deviations is as small as possible. As a sequential process, the heuristic seeks to monotonically increase progress toward the objective function.

The heuristic algorithm we used to implement the weighted deviations model consists of two phases. In the first phase we successively select items so as to decrease the expected weighted sum of positive deviations (details are given later). That is, for each item in the pool we compute the weighted sum of positive deviations that would be expected if this item were added to the test. We then choose the item with the smallest expected weighted sum of positive deviations and add it to the test.

Once the desired test length has been reached we enter a replacement phase. In this phase we successively replace previously selected items until no further improvement in the weighted sum of positive deviations can be made.

This essentially follows the pattern of a goal seeking or greedy heuristic (see, for example, Nemhauser and Wolsey, 1988, Chapter II.5). It is also similar to an approach successfully used by Ackerman (1989) for the construction of multiple parallel tests, and others who have followed a similar approach include and Kester (1988). Adema (1990) refers to such algorithms as combined construction and improvement heuristics. In addition to making problem solution more tractable, they offer the opportunity to incorporate considerable flexibility into the construction process. Examples of this flexibility are given later.

The details of the heuristic are as follows. The selection phase consists of four steps:

1. For each j, compute the extent to which the upper and lower bounds are expected to be satisfied under the assumption that all remaining items to be selected are drawn randomly from the pool.

2. For each eligible item in the pool, compute the weighted sum of positive deviations that would be expected if the item were selected, taking into account the computations in step 1.

3. Choose the item with the smallest expected weighted sum of positive deviations, and add it to the test.

4. Continue Until n+1 items have been selected.

The purpose of step 1 is to compensate for the fact that sequential selection procedures are often locally optimal but globally suboptimal. If we were to sequentially select items that are optimal with respect to the objective function, we would choose first the items that most contribute to satisfaction of the lower bounds. These items may be less satisfactory with respect to the upper bounds, with the result that later selections must attempt to reverse earlier suboptimal choices. To correct for this we begin each item selection by computing an estimate of the extent to which both the upper and lower bounds will be satisfied, given all previous selections and the likely distribution of item properties/item information for all future selections. Mathematically, if we are selecting the $k^{th}$ item in an n-item test and considering the appropriateness of the $t^{th}$ item in the pool, compute for $j=1, \ldots, J$ $$\left( \sum_{i=1}^{N} a_{ij} x_i \right) + (n-k) v_j + a_{tj}, \qquad (19)$$

where $v_j$ is the average occurrence of property j (or the average item information at the specified ability level if j represents a test information constraint). This quantity is then compared to the upper and lower bounds to compute the expected deviations.

Item set constraints are handled as follows. As each item is considered the heuristic determines whether selection of the item would "bring in" its parent stimulus; that is, does the item have a stimulus and, if so, has the stimulus already been included because of a prior item selection? This results in a count of the number of sets included in the test that have the properties associated with each of the set constraints. The extent to which these set constraints are satisfied is then tested and included in the computation of the expected weighted sum of positive deviations.

If more than one set corresponding to a set constraint will be included in the test then the algorithm also attempts to automatically balance (i.e., make approximately equal) the number of items selected from each of the sets. It does this by adding to the sum of the weighted positive deviations the difference between the average number of items across the selected sets and the minimum or maximum number of items across the selected sets. Similarly, since one-item sets are considered undesirable, a penalty is added to the sum of the weighted deviations if a set would be expected to be included in the test with only one of its items selected.

The replacement phase consists of three steps:

5. Find the selected item whose replacement would most reduce the weighted sum of positive deviations. Remove it from the test.
6. Find the best replacement item, that is, the item which if added to the test would result in the smallest weighted sum of positive deviations.
7. If the removal and replacement process would reduce the weighted sum of positive deviations then add the replacement item to the test. Otherwise, stop.

Various methods of pairing the replacement items, that is, the item removed and the item added, were considered. The method represented in steps 6 and 7 is the simplest and most efficient one, and has worked well in practice. Moreover, the replacement phase often does not improve the solution simply because the inclusion of the expectation (step 1) compensates for what would otherwise be suboptimal choices in the selection phase. An elaboration of the replacement procedure in steps 6 and 7 would be to consider simultaneously the effect on the weighted deviations of all possible pairs of items currently selected against items available to be added, and other elaborations are of course possible. One advantage of an heuristic is the flexibility it allows in incorporating such elaborations.

Item set constraints are handled in the replacement phase much as they are in the selection phase (steps 1 through 4). When an item is removed the heuristic determines whether its parent stimulus should also be removed because the set would otherwise be empty, and the impact on set constraints in then computed as appropriate.

Results

The weighted deviations model and the heuristic for solving it were investigated by applying them to several test construction problems. The data for these problems was obtained from actual test assemblies for active testing programs. In each case the data includes real test specifications and actual item data.

Many, if not most, test assemblies resulted in a value of zero for the objective function (equation 12). In these cases, the weighted deviations model performed exactly as the model given by equations (1) through (5) would have. However, a number of assemblies resulted in an objective function greater than zero it is these cases which are of interest, since the model (1) through (5) would have been infeasible.

The results of an analysis of several of these cases are shown in Table 1. The second column briefly characterizes the type of test being assembled, and the third column shows its intended length (number of items). The fourth column contains the number of test specifications (constraints in the test specialist's terminology) the test is subject to. Note that both lower and upper bounds must be applied to each of these J specifications, resulting in 2J equations. The fifth column shows the number of items and subsets in the pool (N in the model). The next two columns contain the number of variables and the number of equations in the binary programming problem, and thus characterize the size of the problem from a mathematical programming point of view.

TABLE 1

Comparision of heuristic and MILP solvers

| | | Test length | | | | | Weighted deviations | | CPU time (secs) | |
|---|---|---|---|---|---|---|---|---|---|---|
| Case | Test | (n) | J[1] | N[2] | Var[3] | Equ[4] | Heuristic | MILP | Heuristic | MILP |
| 1 | Sentence completion | 27 | 39 | 452 | 617 | 84 | 1 | 1 | 15 | 435 |
| 2 | Logical reasoning | 25 | 38 | 298 | 459 | 120 | 3 | 3 | 17 | 2056 |
| 3 | Verbal | 70 | 64 | 343 | 748 | 204 | 3 | 2 | 61 | 163 |
| 4 | Mathematics | 25 | 103 | 506 | 919 | 217 | 9 | 3 | 34 | 1175 |
| 5 | Sentence completion | 40 | 60 | 1025 | 1314 | 146 | 4 | 1 | 85 | 1958 |
| 6 | Verbal | 76 | 54 | 1064 | 1333 | 136 | 3 | 3 | 144 | 434 |
| 7 | Mathematics | 65 | 155 | 741 | 1370 | 326 | 4 | 3 | 165 | 969 |
| 8 | Mathematics | 60 | 126 | 903 | 1424 | 262 | 11 | 7 | 155 | 13522 |

[1]J = # test specifications ("constraints" in test specialist's terms)
[2]N = # items and subsets
[3]Var = # variables in binary programming model
[4]Equ = # equations in binary programming model The next pair of columns show the results of applying, separately, the heuristic and a mixed integer linear programming (MILP) solver. To effect the later the model was first formulated using the General Algebraic Modeling System (GAMS) (Brooke, Kendrick, & Meeraus, 1988). This system provides a means of expressing linear programming models and applying several types of solvers to them. The GAMS model was then solved using the Zero One Optimization Method. This method first solves the linear programming relaxation, then applies a pivot and complement heuristic, and finally uses a branch-and-bound procedure (see Brooke, Kendrick, & Meeraus, 1988, Appendix E, for details). The pair of columns labeled "weighted deviations" show the values of the objective function obtained by the heuristic and by the MILP solver.

The final two columns show the CPU time required for each of the two procedures. The models were all run on a 386-based 20 MHz PC with 4 MB RAM.

The first two cases represent assemblies of sections of larger tests. (Test specialists sometimes assemble sections separately and then combine them to form the final test; in other cases the test is assembled as a whole.) The item pools for these cases are relatively small. No sets are involved in the first pool, while 38 sets are included in the second pool. Both assemblies involve a relatively small number of test specifications, with five of the specifications representing points on the ability metric at which test information is constrained. The specifications are generally consistent with the proportion of items in the pool; that is, few of the specifications call for much larger or much smaller numbers of items to be selected than would be expected given the representation of the characteristic in the pool. Thus, it would be expected that these assemblies would readily satisfy most of the test specifications.

In the first case the heuristic and the MILP procedure failed to meet one of the test specifications, and each missed the same specification by one item. This was a particularly difficult specification to satisfy because there were few items in the pool having the relevant characteristic. In the second case the heuristic and the MILP procedure again failed to meet one of the test specifications, and each missed the same specification, but in this case each selected three fewer items than desired.

The third case represents a full-length verbal test with a relatively small item pool with no sets. The assembly was constrained by a moderate number of specifications, again including bounds on the test information function at five ability levels. The specifications are consistent with the characteristics of the pool, with only a few that are difficult to meet. The heuristic and the MILP solver both failed to meet one specification, with the heuristic failing by three items and the MILP solver failing by two.

The mathematics test shown in the fourth row is a short version of a corresponding full-length test. This case involves a relatively small pool with a small number of sets, and a fairly large number of test specifications. This test does not use IRT statistics; most such tests express statistical specifications as upper and lower bounds on the number of items that may be chosen from each interval in a frequency distribution of item difficulty and/or discrimination. The specifications are largely consistent with the pool characteristics, though several are difficult to meet. The heuristic failed to meet eight specifications by one item and one specification by three items (weights less than one caused the deviations to total nine). The MILP solver missed three specifications by one item, with two of those specifications also missed by the heuristic. In this case it is clear that the problem in meeting specifications was in simultaneously trying to satisfy all of the specifications, rather than any one or two of the specifications being extraordinarily difficult to meet.

The fifth case shows the results of assembling a section of a longer test from a large pool from which the sets have been removed. A moderate number of test specifications are involved, with no test information requirements, and a few of the test specifications are difficult to meet. The heuristic missed four specifications by one item each, while the MILP solver missed a different specification by one item.

The verbal test shown in the next row was assembled from a large pool with no sets. The number of test specifications is moderate, with no test information constraints. In this case more than half of the test specifications are difficult to satisfy. Both the heuristic and the MILP solver failed to meet one of the particularly difficult specifications, in both cases by three items.

The seventh case represents a full-length test assembled from a moderate sized pool with a small number of sets. A very large number of test specifications are involved, including constraints on test information at 11 points on the ability metric. The specifications are generally consistent with the pool, though some had too few items. The heuristic missed three non-statistical specifications by one item and failed to meet the target test information at three points. The MILP solver failed on the same three non-statistical specifications, but met the test information targets.

In the last case a full-length test was assembled from a large item pool with no sets. The number of test specifications is large, no IRT targets are included, and the test specifications are generally difficult to satisfy. The heuristic failed to meet five specifications by one item and one specification by two items. The MILP solver missed three specifications by one item, all of which were also missed by the heuristic.

In most cases the tests chosen by the heuristic and the MILP solver were quite different. The number of items in common between the two solvers varied from none to about 60%. The most typical case had about one-quarter to one-third of the items in common.

Table 2 shows six additional cases in which only the heuristic was attempted. These cases all involve large numbers of sets, which result in pools (items and subsets) that are extremely large. The resulting MILP model requires numbers of variables that exceed the implementation limitations of the microcomputer we were using. The routine operational use of a MILP solver for problems of this size would not be practical unless a very much larger computer were available to the test specialist.

TABLE 2

Solutions using the heuristic algorithm

| Case | Test | Test length (n) | J[1] | N[2] | Var[3] | Equ[4] | Weighted deviations | CPU time (secs) |
|---|---|---|---|---|---|---|---|---|
| 1 | Mathematics | 60 | 129 | 6647 | 7164 | 446 | 1 | 996 |
| 2 | Arithmetic reasoning | 24 | 52 | 11521 | 11730 | 152 | 6 | 32 |
| 3 | Reading | 28 | 61 | 25505 | 25750 | 159 | 2 | 52 |
| 4 | Verbal | 40 | 34 | 46114 | 46255 | 154 | 12 | 95 |
| 5 | Verbal | 70 | 98 | 143381 | 143786 | 270 | 3 | 4411 |
| 6 | Reading and sentence completion | 40 | 72 | 146202 | 146491 | 397 | 2 | 4791 |

[1] J = # test specifications ("constraints" in test specialist's terms)
[2] N = # items and subsets
[3] Var = # variables in binary programming model
[4] Equ = # equations in binary programming model The heuristic performed well on these problems, with weighted deviations reasonably small. CPU times are in some cases substantially larger than the cases shown in Table 1 because of the additional complexity of handling sets. This is particularly true in cases where the sets tend to contain many items, as in the last row of the table.

In what follows, we demonstrate how the four types of constraints discussed for conventional test assembly are implemented in adaptive testing by the weighted deviations algorithm.

Constraints on intrinsic item properties

The control of intrinsic item features is accomplished through the use of explicit constraints, that is, lower and upper bounds (which may be equal) on the desired number of items which possess a feature. If items have been coded to a sufficient level of detail, it is possible to control the second type of constraint on item selection, undesirable overlap among items, by the same mechanism. For example, items that give away answers to other items can be assigned a common code and then a constraint specified that only one such item may be included in an adaptive test. Likewise items that test the same point, or items that have similar incidental features could be assigned codes and constraints imposed to limit the number of such items.

Constraints on Item Features in Relation to All Other Candidate Items

In practice, it may be difficult to develop and implement an item coding scheme with sufficient level of detail so that all overlap can be controlled by the imposition of explicit constraints alone. Instead, another mechanism must be employed—that of overlap groups. An overlap group consists of a list of items that may not appear together in the same adaptive test. Overlap groups do not have to imply transitivity of overlap. That is, item A may overlap with item B, and item B may overlap with item C, but that does not imply that item A overlaps with item C since the reasons for the overlap may be different. An extension of this concept is that overlap groups do not imply mutually exclusive groups of items since, again, the items may overlap for different reasons. Contrary to Wainer and Kiely's assertion that it is necessary "to compare all conceivable subsets of items derivable from the item pool" (1987, page 188) these overlap groups can be formulated fairly simply by basically clerical methods. The detection of word (as opposed to content) overlap is made relatively simple by employing computerized tools that use (fallible) morphological algorithms to identify overlapping words. The detection of content overlap is more complex, but is still made feasible with computerized tools employing thesaurus-based algorithms to identify content similarities.

Once formed, these groups are used by the item selection algorithm to avoid the selection of any item that appears in a group with an item already administered. This provides a simple and completely effective solution to the problem of avoiding overlapping items.

Constraints on Item Features in Relation to a Subset of All Other Candidate Items Theunissen (1986, p. 387) suggested that sets of items based on a common stimulus could be incorporated into a maximum information adaptive testing paradigm by the use of a set information function as the sum of the item information functions for the items comprising that set. This approach is effective in the context of constructing tests made up entirely of sets of items based on a common stimulus where the items associated with a particular stimulus are fixed in advance of test assembly and where the number of items in each set is equal or approximately equal. This approach must be modified for a test composed of a mixture of item sets and discrete items or if the number of items in a set varies greatly across sets. This is so in the first instance because a set information function computed from a number of items will usually dominate an item information function of a single item. In the second instance, set information functions from sets with larger numbers of items will usually dominate set information functions from sets with smaller numbers of items.

A further complication occurs in the more general case when the items to be administered from the set of items associated with a common stimulus are not specified in advance. Typically stimulus material is pretested with many more items than would be desirable to include in any single test, and the subset of these items administered to an examinee in an adaptive test depends upon the current estimate of examinee ability, although the size of the subset may be specified in advance. In this context, one would have to compute the set information functions for all possible subsets of the set of items associated with a common stimulus.

The approach we have taken builds on Theunissen's suggestion by computing partial sums of item information functions as items from the set are administered. This approach is useful for the incorporation of items sets whether based on common stimulus material or common directions or some other feature which requires that the administration of items belonging to a set not be interrupted by the administration of other items not belonging to the same set. Each item set is assigned a conceptual partition of the item pool (a block); items not belonging to sets are not considered to be in such a partition. Some blocks may be designated as reenterable with a fixed number of items to be administered at each entry. For example, we might have a block of 100 synonym items and require that three synonym items must be administered together in a test that was constrained to have nine synonym items in all. Other blocks may be designated as not reenterable with a fixed number of items to be administered, as in a set of 10 items associated with a reading passage from which we want to administer three items.

Blocks are entered (or possibly reentered) by the selection of an item in that block 1) that contributes the most to the satisfaction of all other constraints, and 2) that does not appear in an overlap group containing an item already administered. Once within a block, items continue to be selected adaptively for administration based on their contribution to the satisfaction of all constraints and overlap, until the number of items to be administered at that entry into the block is reached. If the block is not reenterable, it is then removed from further consideration in the pool; if it is reenterable, then the block remains available.

Constraints on the Statistical Properties of Items

The main psychometric feature of adaptive testing is to select items that have optimum statistical properties for measuring a particular examinee's ability. For the implementation described in our example, we have adopted Lord's (1977) approach and consider that an item has optimum statistical properties if it has the largest item information function at the examinee's estimated ability level. Other approaches are, of course, possible.

In the context of the adaptive testing algorithm, the lower and upper bounds for this constraint are set equal to some large positive number. When considering the statistical properties of items, the weighted deviations algorithm will select those items that have the largest item information function at the current estimate of the examinee's ability.

The flowcharts in FIG. 1 depict the method by which the preferred embodiment of this invention is implemented.

FIG. 1(a) shows the environment in which item selection takes place, that is, within the administration of a computerized adaptive test. Note that the dashed lines and boxes represent functions within the test delivery system itself, and therefore outside the scope of this invention.

The test delivery system, in order to employ this method of item selection, must first invoke a procedure to initialize the item selection process. Following this, it must invoke the select next item procedure for each item to be selected. If the stopping rule is not reached, the process of selecting the next item is invoked until the stopping rule is reached, at which point the test is scored.

Figure 1B:
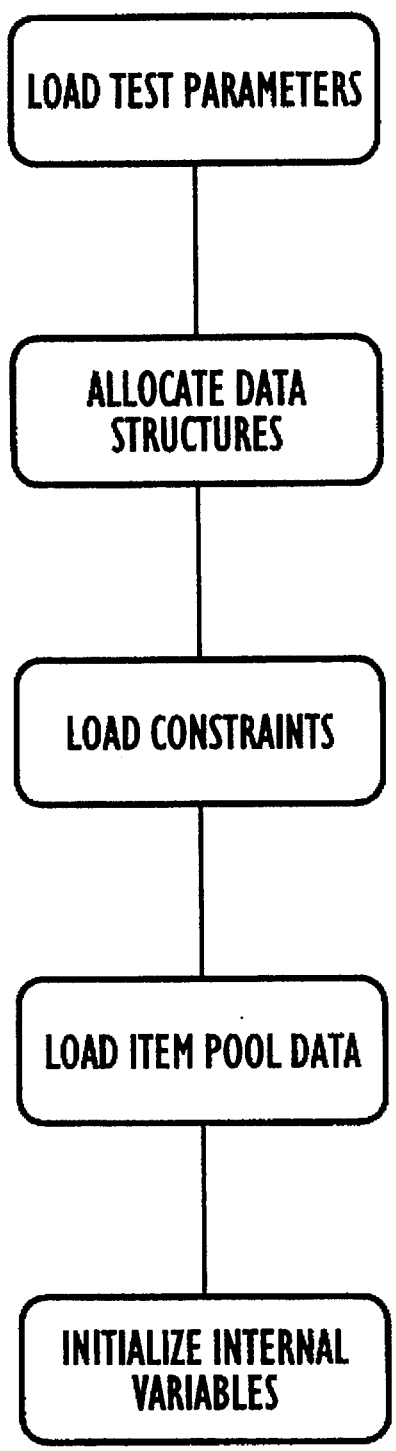
FIG. 1(b) is a flowchart of the initialize selection routine of a preferred embodiment of the present invention.

The initialize selection process is shown in greater detail in FIG. 1(b). This involves the procedure of loading test parameters, allocating data structures, loading constraints and item pool data, and initializing the internal variables.

Figure 1C:
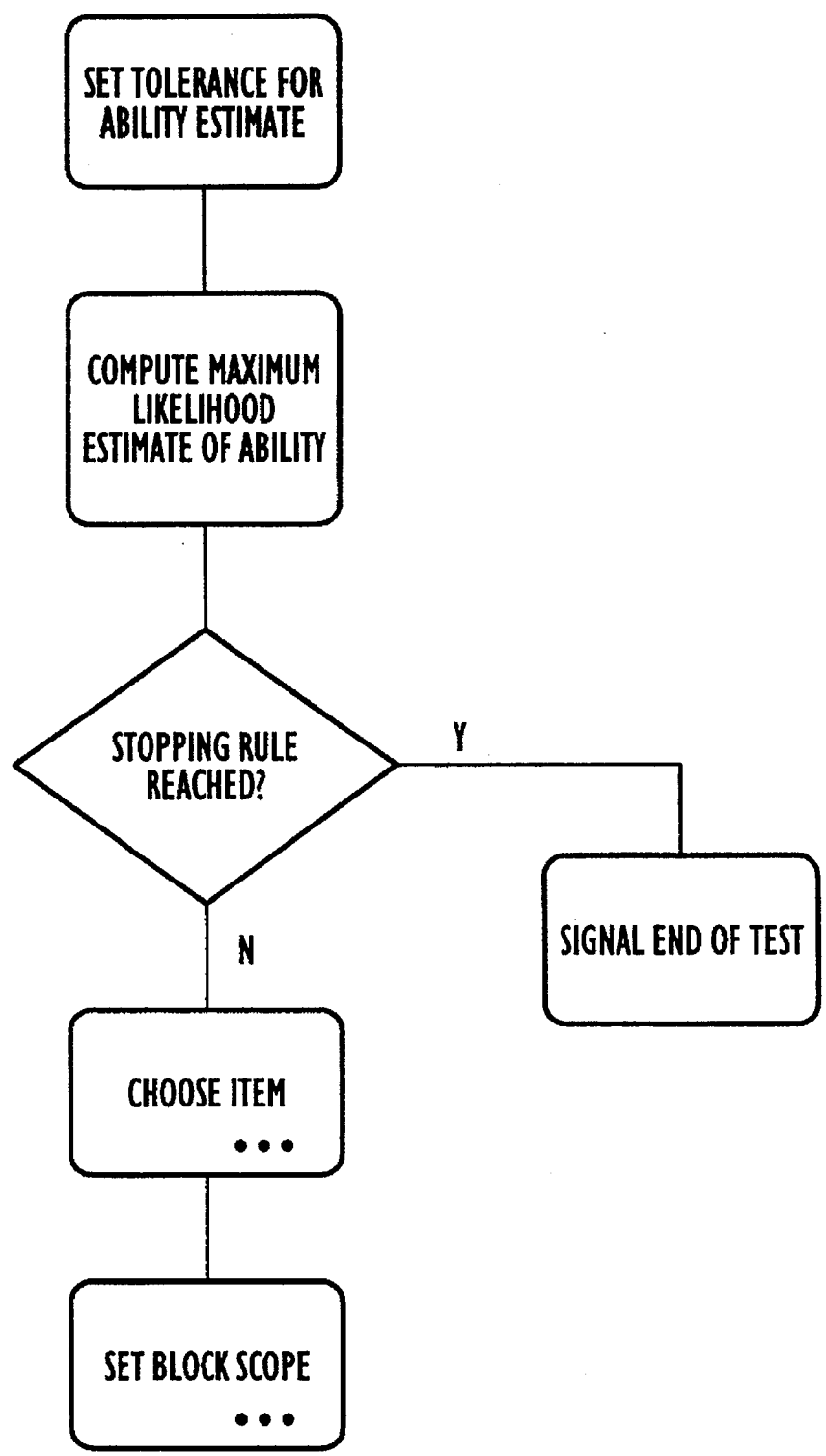
FIG. 1(c) is a flowchart of the select next item routine of a preferred embodiment of the present invention.

The select next item procedure of FIG. 1(a) is shown in greater detail in FIG. 1(c). First, the tolerance for the ability estimate is set. The maximum likelihood estimate of ability is computed, after which it is determined if the stopping rule is reached. If the stopping rule has been reached, the end of the test id signalled. If not, an item is chosen, and the block scope is set.

Figure 1D:
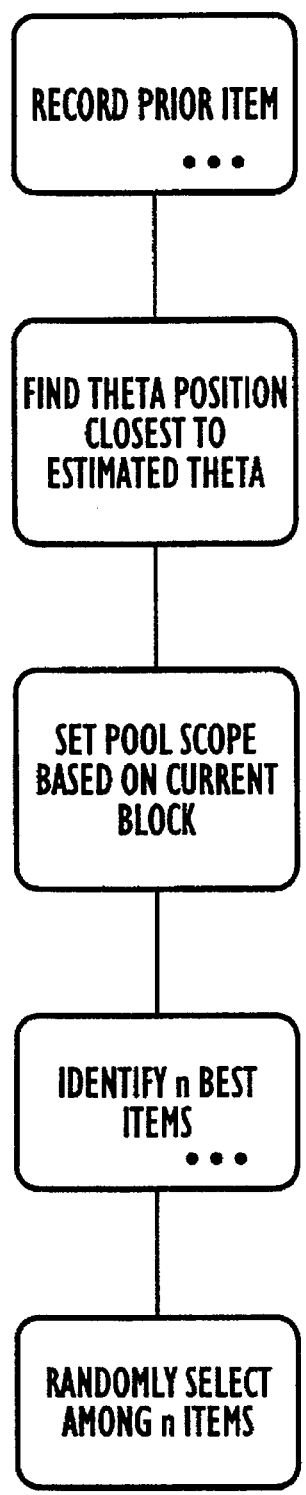
FIG. 1(d) is a flowchart of the choose item routine of a preferred embodiment of the present invention.

The process for choosing the item is shown at FIG. 1(d). First, the prior item is recorded. The theta position closest to estimated theta is found, and the pool scope based on the current block is set. The process then identifies n best items, and randomly selects among n items.

Figure 1E:
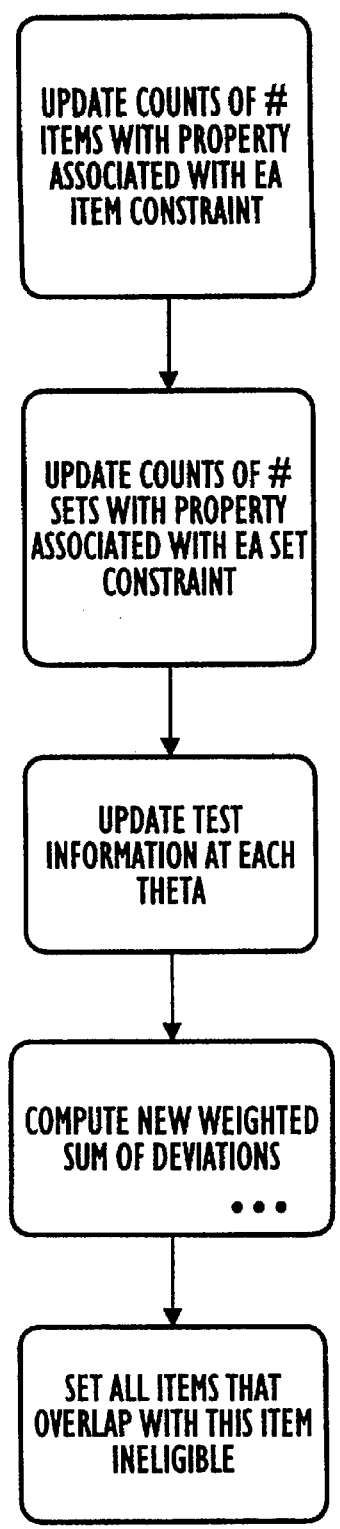
FIG. 1(e) is a flowchart of the record prior item routine of a preferred embodiment of the present invention.

The process of recording the prior item is shown at FIG. 1(e). First, the counts of number of items with property associated with each item constraint is updated. Likewise, the counts of number of sets with property associated with each set constraint is updates. The test information at each theta is updated. A new weighted sum of deviations is computed, and all items that overlap with this item are set ineligible.

Figure 1F:
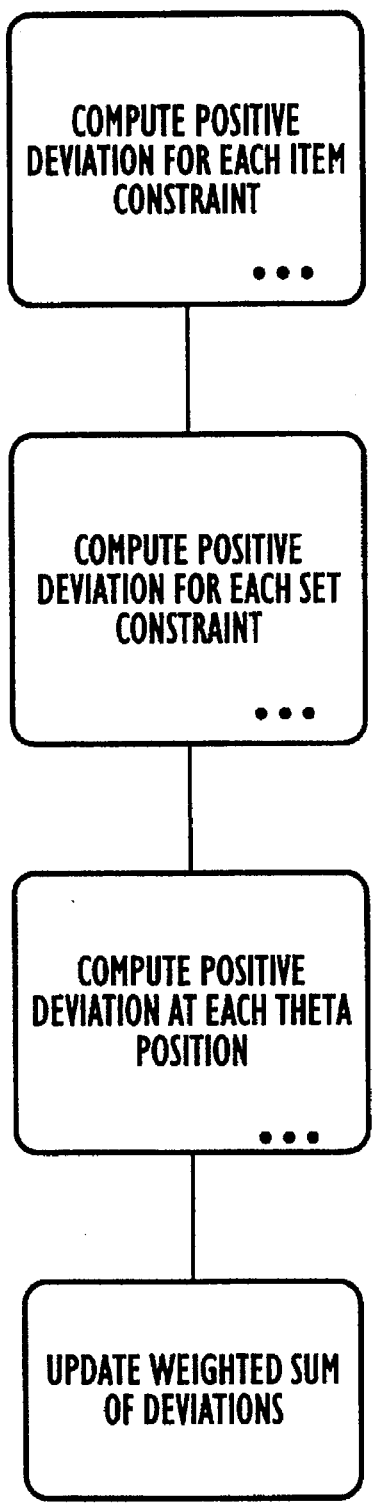
FIG. 1(f) is a flowchart of the compute weighted sum of deviations routine of a preferred embodiment of the present invention.

The procedure for computing the weighted sum of deviations is shown at FIG. 1(f). First, the positive deviation for each item constraint is computed. The positive deviation for each set constraint is then computed. The positive deviation at each theta position is computed, and the weighted sum of deviations is updated.

Figure 1G:
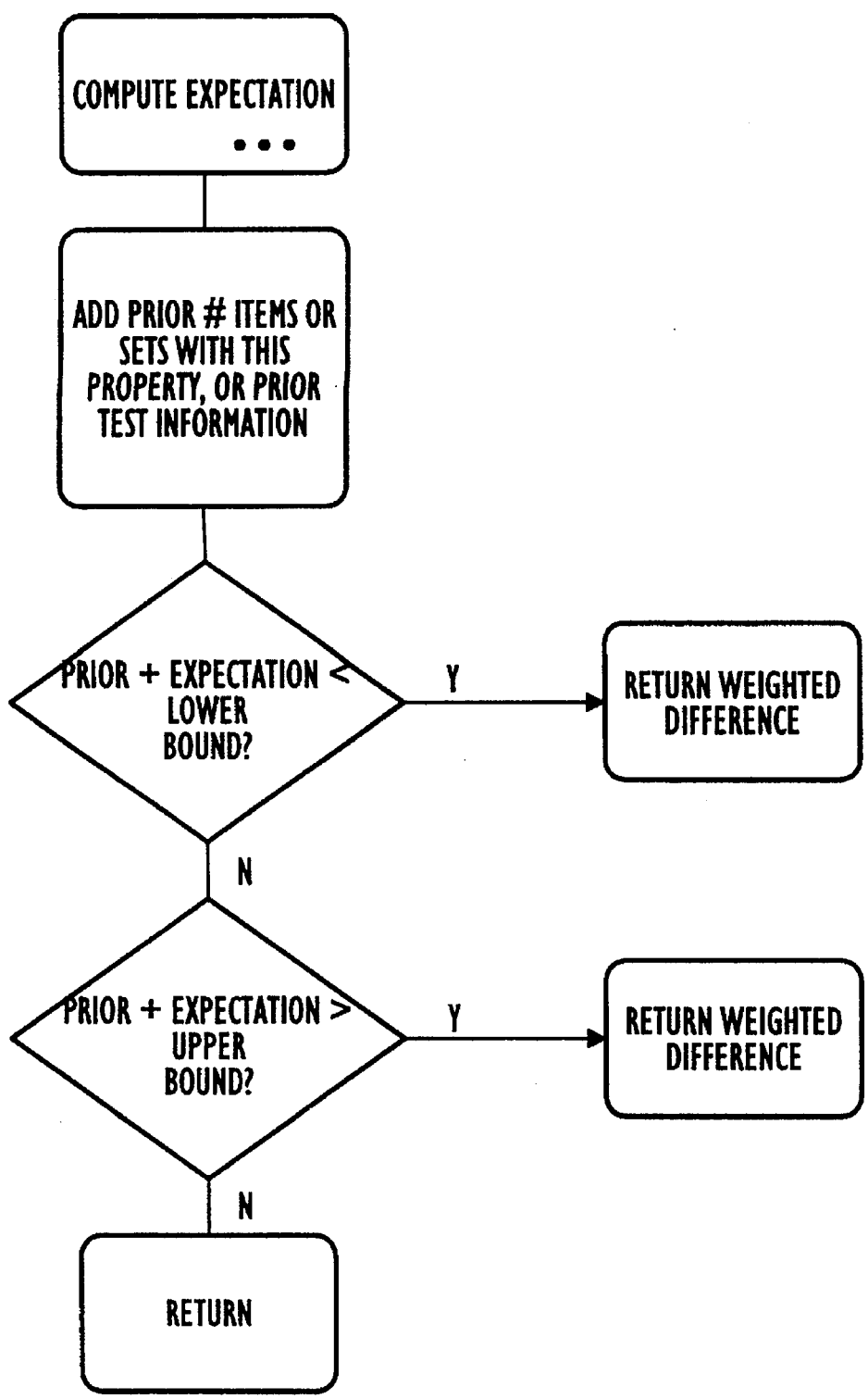
FIG. 1(g) is a flowchart of the compute positive deviation routine of a preferred embodiment of the present invention.

The procedure for computing the positive deviation is illustrated at FIG. 1(g). First, the expectation is computed. Then, the process adds the prior number of items or sets with this property, or prior test information. If the prior plus expectation is less than the lower bound, the weighted difference is returned. If not, but the prior plus expectation is greater than the upper bound, the weighted difference is returned. If both these tests fail, the procedure then returns.

Figure 1H:
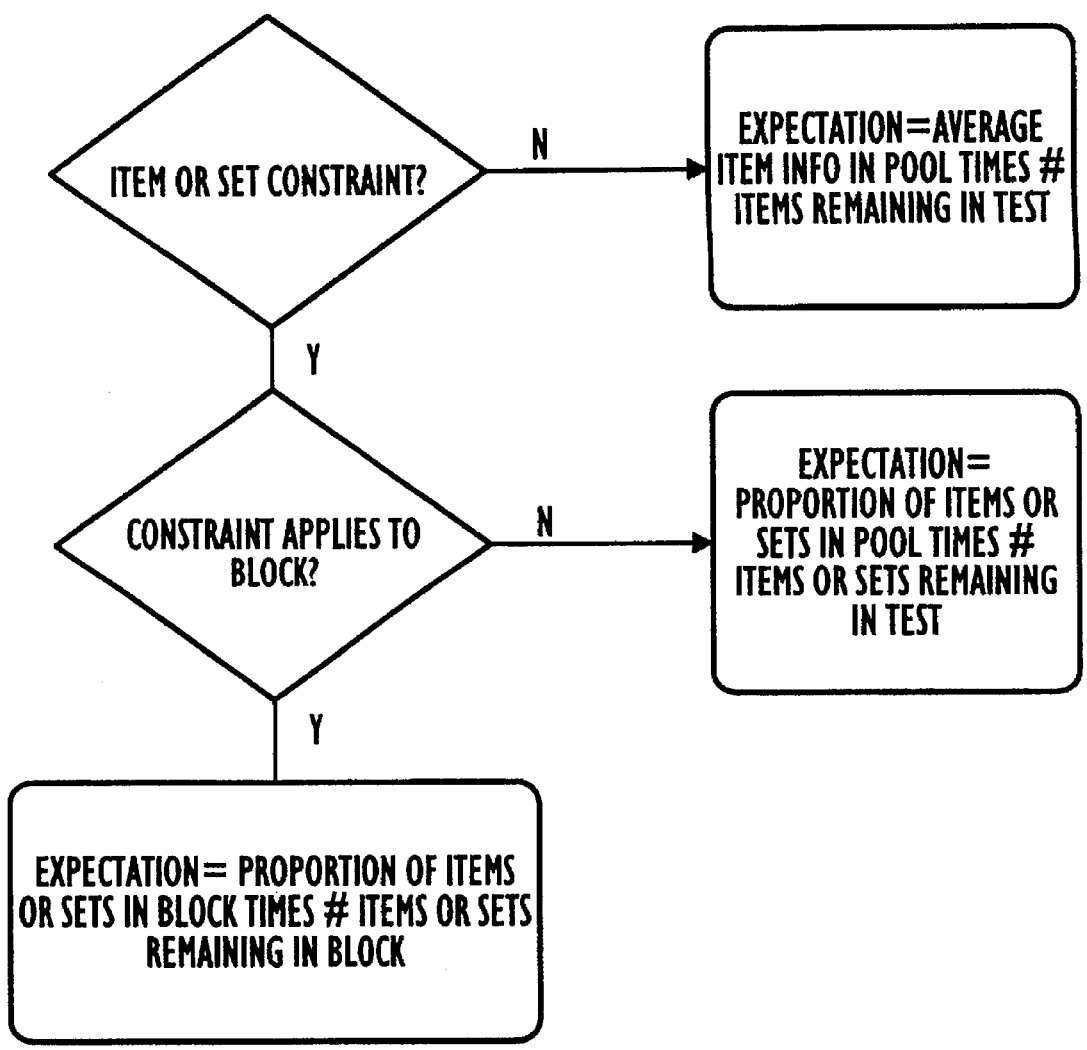
FIG. 1(h) is a flowchart of the compute expectation routine of a preferred embodiment of the present invention.

FIG. 1(h) shows how the expectation is computed. If it is not an item or set constraint, the expectation equals the average item information in the pool times the number of items remaining in the test. If it is an item or test constraint, but the constraint does not apply to the block, then the expectation equals the proportion of items or sets in the pool times the number of items or sets remaining in the test. If, however, the constraint does apply to the block, then the expectation equals the proportion of items or sets in the block times the number of items or sets remaining in the block.

Figure 1I:
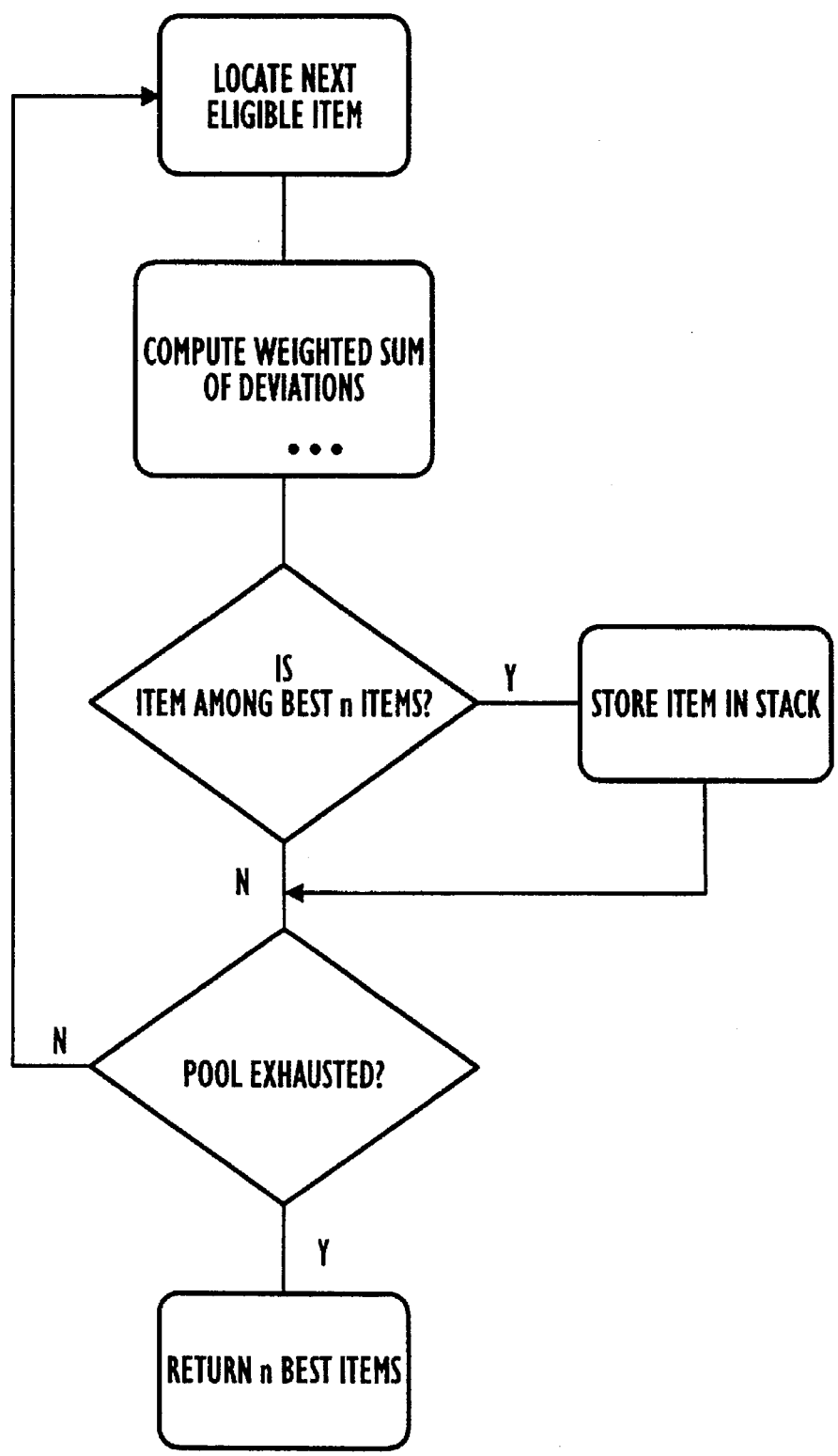
FIG. 1(i) is a flowchart of the identify n best items routine of a preferred embodiment of the present invention.

The step of identifying n best items, which is required by the choose item procedure of FIG. 1(d), is shown at FIG. 1(i). First, the next eligible item is located. The weighted sum of deviations is computed (see FIG. 1(f). If the item is among the n best items, it is stored in a stack; if not, it is not stored in a stack. If the pool is not exhausted, the process is invoked again until the pool is exhausted. This will return the n best items.

Figure 1J:
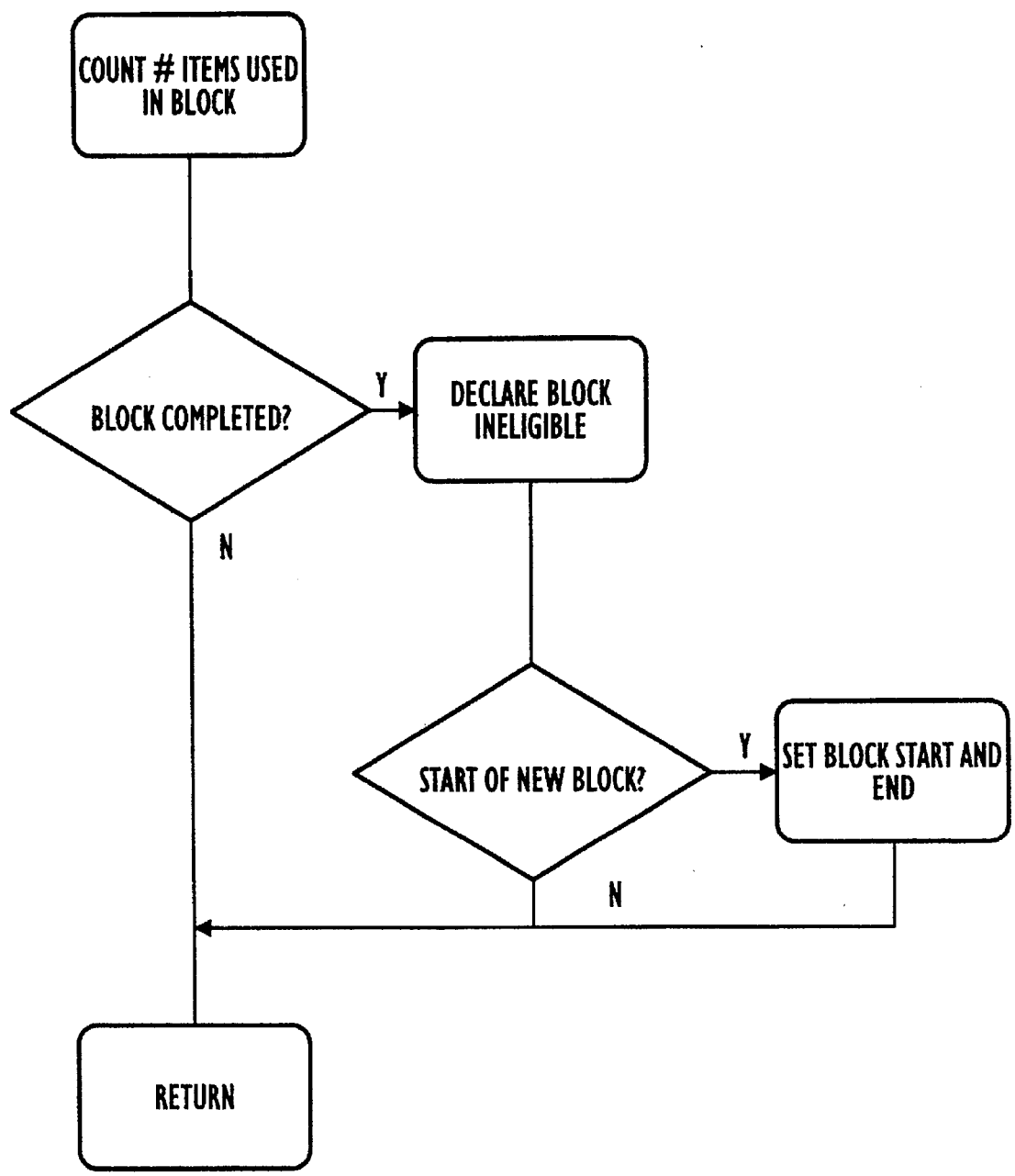
FIG. 1(j) is a flowchart of the set block scope routine of a preferred embodiment of the present invention.
Figure 2:
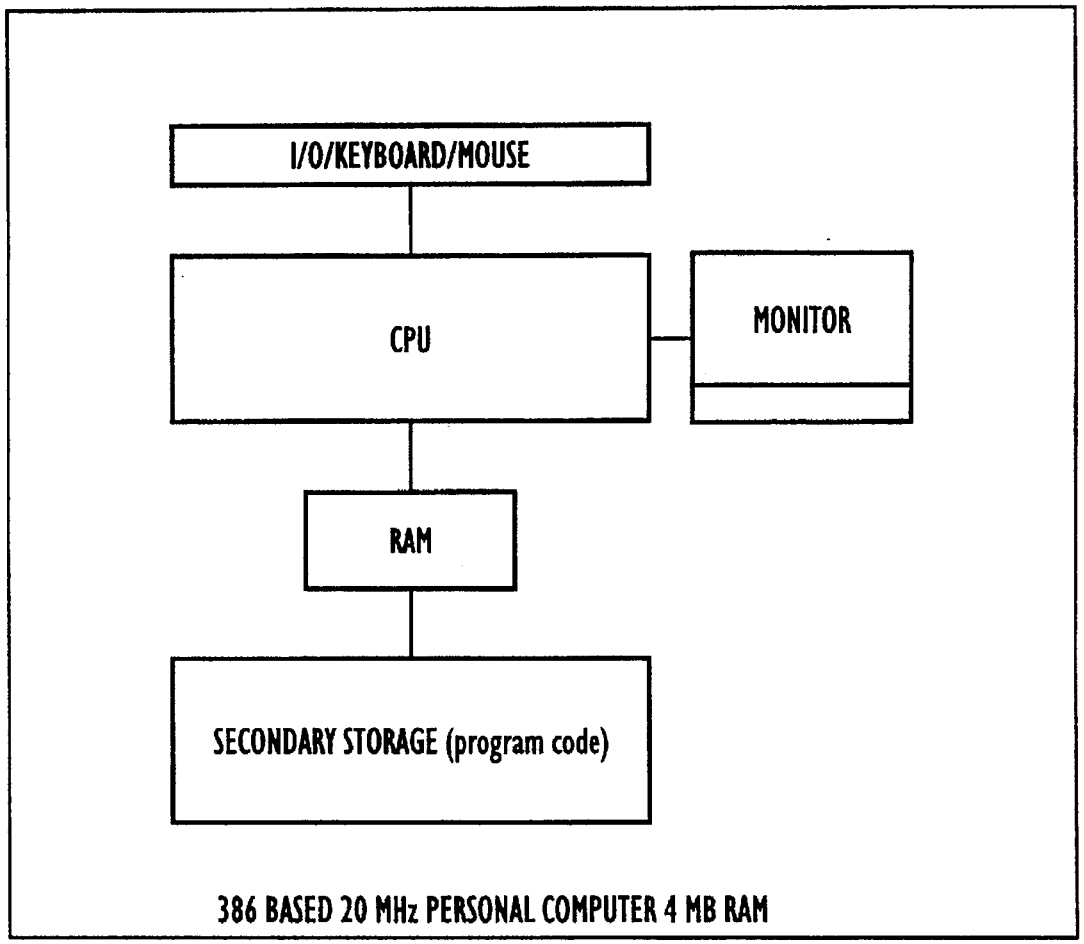
FIG. 2 is a block diagram of the computer hardware used to implement a preferred embodiment of the present invention.

The step of setting the block scope, which is required by the select next item procedure of FIG. 1(c), is shown at FIG. 1(j). First, the number of items used in the block is counted. If the block is not completed, the function returns. If the block is completed, however, it is declared ineligible, and the start of new block query is invoked. If the answer to this is negative, the function returns; if positive, the block start and end is set and the function returns.

EXAMPLE 1

The context of this example is the design of a verbal adaptive test through a Monte Carlo simulation study to determine test properties. The goal of this design effort was to construct a test as parallel as possible in terms of content to an existing conventional 85-item paper-and-pencil test and to achieve an estimated reliability of 0.91, the average reliability of the most recent 10 editions of the conventional test, in the shortest possible (fixed) adaptive test length.

The Item Pool

The available item pool contained 518 real verbal items, 197 of which were associated with 51 reading passages. All items had been calibrated on large samples (2000+) from the current testing population using the 3-parameter logistic (3PL) item response model and the computer program LOGIST (Wingersky, 1983). The mean estimated value of a for the pool was 0.86, with a standard deviation of 0.28, and a range from 0.22 to 1.83. The mean estimated b was 0.17, with a standard deviation of 1.31 and a range from −3.68 to 3.32. The mean estimated c was 0.17 with a standard deviation of 0.09 and a range of 0.00 to 0.50. An examination of the quality of the pool in terms of the information function for the entire pool indicated that the pool, in the aggregate, contains more information at ability levels above the average ability level of zero than below the average ability level.

The Content Constraints

Items and passages to be selected for this test can be classified according to 54 different features. Test development specialists specified the number of items desired for each feature, paralleling the process of assembling the current conventional test. These 54 constraints on item selection are listed in Table 3. The weighted deviations model actually employs a single constraint for every feature that has equal lower and upper bounds, and two constraints for every feature that has unequal lower and upper bounds. Thus, from the perspective of the weighted deviations algorithm, the specifications in Table 3 represent a total of 97 constraints (11+2×43). However, for ease of discussion we will adopt the test specialists perspective of 54 constraints on item features.

TABLE 3

Content Constraints and Weights for the Adaptive Verbal Test

| No. | Description | LB[1] | UB[2] | W[3] | N[4] |
|-----|-------------|-----|-----|----|----|
| 1 | Long Passages | 2 | 2 | 20 | 26 |
| 2 | Medium Passages | 1 | 1 | 20 | 25 |
| 3 | Science Passages | 1 | 1 | 20 | 11 |
| 4 | Humanities Passages | 0 | 1 | 2 | 8 |
| 5 | Social Science Passages | 0 | 1 | 1 | 13 |
| 6 | Argumentative Passages | 0 | 1 | 1 | 10 |
| 7 | Narrative Passages | 0 | 1 | 1 | 9 |
| 8 | Male-reference Passages | 0 | 1 | 20 | 16 |

TABLE 3-continued

Content Constraints and Weights
for the Adaptive Verbal Test

| No. | Description | LB[1] | UB[2] | W[3] | N[4] |
|---|---|---|---|---|---|
| 9 | Female-reference Passages | 0 | 1 | 1 | 2 |
| 10 | Minority-reference Passages | 1 | 1 | 20 | 14 |
| 11 | Reading items (RCMP) | 8 | 8 | 20 | 197 |
| 12 | Main idea items | 1 | 4 | 1 | 35 |
| 13 | Explicit statement items | 1 | 4 | 1 | 52 |
| 14 | Inference items | 2 | 5 | 1 | 58 |
| 15 | Other items | 1 | 4 | 1 | 52 |
| 16 | Medium, 1st half items | 0 | 1 | 0 | 17 |
| 17 | Medium, 2nd half items | 0 | 1 | 2 | 22 |
| 18 | Medium, total passage items | 0 | 1 | 0 | 41 |
| 19 | Long 1st half items | 0 | 2 | 0 | 25 |
| 20 | Long 2nd half items | 0 | 2 | 0 | 39 |
| 21 | Long, total passage items | 0 | 2 | 0 | 53 |
| 22 | Sentence completion items (SNCP) | 5 | 5 | 20 | 95 |
| 23 | SNCP art items | 1 | 2 | 3 | 25 |
| 24 | SNCP practical affairs items | 1 | 2 | 3 | 27 |
| 25 | SNCP science items | 1 | 2 | 3 | 21 |
| 26 | SNCP human relations items | 1 | 2 | 3 | 22 |
| 27 | SNCP 1-blank items | 2 | 2 | 20 | 40 |
| 28 | SNCP 2-blank items | 3 | 3 | 20 | 55 |
| 29 | SNCP male-reference items | 0 | 1 | 20 | 16 |
| 30 | SNCP female-reference items | 2 | 2 | 20 | 25 |
| 31 | SNCP beginning with 'although' | 0 | 1 | 0 | 8 |
| 32 | SNCP beginning with 'because' | 0 | 1 | 0 | 9 |
| 33 | Analogies (ANAL) | 6 | 6 | 20 | 85 |
| 34 | Arts analogies | 1 | 2 | 1 | 20 |
| 35 | Practical affairs analogies | 1 | 2 | 1 | 21 |
| 36 | Science analogies | 1 | 2 | 1 | 26 |
| 37 | Human relations analogies | 1 | 2 | 1 | 18 |
| 38 | Concrete analogies | 1 | 3 | 1 | 24 |
| 39 | Mixed analogies | 1 | 3 | 0 | 31 |
| 40 | Abstract analogies | 1 | 3 | 1 | 30 |
| 41 | Synonym analogies | 0 | 1 | 0 | 4 |
| 42 | Degree analogies | 0 | 1 | 0 | 11 |
| 43 | Traits analogies | 0 | 1 | 1 | 15 |
| 44 | Opposition analogies | 0 | 1 | 0 | 13 |
| 45 | Classification analogies | 0 | 1 | 1 | 11 |
| 46 | Causation analogies | 0 | 1 | 0 | 4 |
| 47 | Antonyms (ANTM) | 8 | 8 | 20 | 141 |
| 48 | Arts antonyms | 1 | 2 | 1 | 30 |
| 49 | Practical affairs antonyms | 1 | 2 | 3 | 30 |
| 50 | Science antonyms | 1 | 2 | 3 | 38 |
| 51 | Human relations antonyms | 1 | 2 | 1 | 43 |
| 52 | Verb antonyms | 1 | 4 | 1 | 36 |
| 53 | Noun antonyms | 1 | 4 | 1 | 32 |
| 54 | Adjective antonyms | 1 | 4 | 1 | 73 |

[1] Lower Bound;
[2] Upper Bound;
[3] Weight;
[4] Number in Pool

At the beginning of this test design experiment, lower and upper bounds for each constraint were specified for adaptive test lengths of 20, 21, ..., 30, because it was hypothesized in advance that the final satisfactory test length would lie within this range. Shown in Table 3 are the lower and upper bounds for the final adaptive test of 27 items. Also shown are the relative weights given the satisfaction of each constraint in the final test design; these weights reflect the relative importance of the constraint to the test specialists. In addition, the number of passages or items in the pool that are identified as having each specific property is listed.

The first 10 constraints are relevant to the content of reading passages. For example, a passage may be classified as (long or medium), as having content from the fields of (science, humanities, social science), as being (argumentative, narrative) in style, containing references to (females, males) and references to (minorities). The next 11 constraints are relevant to the items associated with the reading passages. These items may ask about the main idea of a passage, and explicit statement, or require inference, etc. Constraints 22 through 32 are constraints on sentence completion items; constraints 33 through 46 are constraints relevant to analogy items; constraints 47 through 54 are relevant to antonym items.

The constraint weights listed in Table 3 are those that were used in the final satisfactory test design of 27 items. The weight given the constraint on item information, computed at 21 different ability levels for each item, was 1.5. Thus, from the perspective of the weighted deviations algorithm, the statistical constraints add an additional 21 constraints on item selection.

The weights in Table 3 were arrived at through an iterative trial-and-error process where constraint weights are specified, the results of adaptive tests are examined for constraint violations, and some weights are changed to reduce important violations. Constraints with the highest weight, 20, are so important that they cannot be violated and the resultant adaptive test be judged acceptable. Others receive lower weights because, although they are considered to be important, some constraint violations may be acceptable.

The imposition of weights can sometimes aid in overcoming deficiencies in the pool. For example, there are 16 passages that reference males and only 2 passages that reference females in the pool. To require the administration in each adaptive test of one male-reference passage and one-female reference passage would greatly compromise the security of the female-reference passage. However, because of the presence of so many male-reference passages, we must weight the constraint for these passages very heavily in order to insure that no more than one male-reference passage is selected for any adaptive test.

Thirteen constraints have zero weights, thus removing these constraints from the problem. This was done for varying reasons. Constraints 16 through 21 all concern items associated with reading passages. The purpose of these constraints was to attempt to insure, for both medium and long reading passages, that examinees received items on information contained in the first half of the passage, the second half of the passage, and the passage as a whole. This is in contrast to the situation where, for example, all items associated with a passage ask about information contained only in the first half of the passage. These constraints were removed because no single reading passage had associated with it items of all possible types, thus constraint violation was inevitable. If these constraints are important to satisfy, the item pool must be augmented with many more passages with many more items of all types associated with them; this was not economically feasible. Some constraints were removed from the problem because there were so few items in the pool that the constraint was almost never violated anyway, for example, constraint 41 or 46, or, upon reconsideration by test specialists, the constraint became viewed as unimportant, for example constraint 31, 32, or 39.

The 41 constraints with nonzero weights in Table 3, plus the constraint on information, overlap, and item sets, constitute the set of desired properties that the weighted deviations algorithm attempts to satisfy in the selection of items for the adaptive test.

Overlap Constraints

Table 4 gives a portion of the set of overlap groups constructed by test specialists after careful examination of the pool. Items may be indicated as overlapping with other items and/or with passages. Passages may be indicated as overlapping with other passages and/or discrete items. If a passages overlaps with another passage or with a discrete item, all of the items associated with the passage(s) are considered to overlap. The entries listed in each overlap group indicate items and passages that may not be administered together in the same adaptive test. For this pool of 518 items and 51 passages, there was a total of 528 such groups with 1358 entries.

TABLE 4

A Portion of the Overlap Groups for the Adaptive Verbal Test

| Group Number | Number in Group | Items/Passages in Group |
| --- | --- | --- |
| 1 | 4 | 232, 22, 242, 103 |
| 2 | 3 | 232, 218, 79 |
| 3 | 3 | 232, 298, 307 |
| . | . | . |
| . | . | . |
| . | . | . |
| 250 | 3 | 321, 284, 281 |
| 251 | 4 | 321, 305, 281, 308 |
| 252 | 3 | 38, 240, 142 |
| . | . | . |
| . | . | . |
| . | . | . |
| 526 | 2 | 449, 550 |
| 527 | 2 | 518, 556 |
| 528 | 2 | 518, 565 |

Item Sets

Table 5 displays a portion of the list of blocks of items that are to be considered in sets. For this example, none of the blocks are reenterable and every item appears in a block. Test specialists feel that to enhance comparability with the conventional paper and pencil test it is necessary to administer all Sentence Completion items together, likewise all Antonyms and all Analogies. Reading Comprehension passages can appear anywhere within the test, but once started, cannot be interrupted. For this pool, there are a total of 54 logical blocks. (It is coincidental that the number of blocks and the number of content constraints are equal for this example.)

TABLE 5

A Portion of the List of Blocks for the Adaptive Verbal Test

| Block | Number to Select | Starting Position | Ending Position | Classification |
| --- | --- | --- | --- | --- |
| 1 | 5 | 1 | 95 | SNCP |
| 2 | 6 | 96 | 180 | ANAL |
| 3 | 8 | 181 | 321 | ANTM |
| 4 | 3 | 322 | 327 | RCMP, long |
| 5 | 3 | 328 | 333 | RCMP, long |
| . | . | . | . | . |
| . | . | . | . | . |
| . | . | . | . | . |
| 52 | 2 | 556 | 559 | RCMP, medium |
| 53 | 2 | 560 | 564 | RCMP, medium |
| 54 | 3 | 565 | 569 | RCMP, long |

The Adaptive Testing Algorithm and the Simulations

As noted earlier, the psychometric basis of the adaptive testing algorithm used in this example is most similar to that of Lord (1977) in the sense that an item is considered to have optimum statistical properties if it most informative at an examinee's current maximum-likelihood estimate of ability. The first item is chosen to have a difficulty of about −1.0 on the ability metric. Maximum likelihood estimates of examinee ability, based on responses to all previous item, are used to select the most informative item for subsequent administration, subject to the constraints on content, overlap and item sets previously described. A randomization scheme is imposed to improve item security in which the first item is randomly chosen from a list of the eight best items, the second item is randomly chosen from a list of the seven best items, and so forth. The eighth and subsequent items are chosen to be optimal.

The final ability estimate, after the administration of 27 items, is converted to an estimated number right true score on a reference set of items using the test characteristic curve (Lord, 1980, equation 4–9). This reference set of items is actually an intact conventional paper-and-pencil edition of the parent form. The 85 items of this form have been calibrated and placed on the same metric as the item pool.

The simulation was performed for 200 simulees at each of 15 values on the reported score metric ranging for just above the chance level on this metric to just below a perfect score. These 15 values are nearly equally spaced on the reported score metric, and unequally spaced on the ability metric. Each simulee took approximately seven seconds on a 386-based micro computer running at 25 mHz. Thus 3000 simulees took approximately six hours.

The Results

The results of the simulation were evaluated in a number of ways, both conditional on score level and unconditionally. To perform the unconditional evaluations, the item parameters and item responses from a group of over 6000 real examinees who took an edition of the 85-item parent form were used to compute an estimated distribution of true ability using the method of Mislevy (1984). Proportional values of this distribution are applied to the conditional results to yield an estimate of the unconditional results in a typical group of test takers.

The estimated reliability, computed using the method of Green, et al. (1984, equation 6) of the 27-item adaptive test is 0.91. This reliability was achieved by using only 295 items (out of 518) and 28 reading passages (out of 51). The reliability of the conventional reference test used for scoring purposes is 0.93, making this test more reliable than the average conventional test.

The adaptive test with few constraints represents the best that can be done in terms of measurement alone from this pool when the only block structure preserved is that of items associated with reading passages. The reliability of this test was 0.94 and was attained using only 144 out of the 518 items and 16 out of the 51 reading passages. The difference between the two adaptive test CSEM curves, particularly throughout the middle of the true score range, represents the penalty imposed, in terms of measurement, by the attempt to satisfy content constraints, overlap constraints, and more elaborate set constraints. The adaptive test with full constraints is as good as it is because it uses more than twice the number of items and nearly twice the number of passages in the pool in order to satisfy as many as possible of the constraints on test construction.

The adaptive test with full constraints specified achieved its measurement without violating overlap constraints or set constraints. However, some content constraints were violated. Table 6 displays, for each constraint with a nonzero weight that had some violation, the proportion of a typical population that could be expected to experience such violations and the typical extent of such violations. The number of items administered for each constraint, averaged over the typical distribution, rarely violates the constraint. However, the unconditional average number of items at each ability level shows that constraint violations tend to occur when there is a relationship between items with a particular feature and the appropriateness of the item for a particular ability level. For example, 30.2% of the typical population have adaptive tests that violated the constraint that between 1 and 2 analogy items on the arts are to be included. A substantial proportion of simulees with below average true ability were administered three such items. Likewise, 64.7% of the typical population have adaptive tests that violated the constraint that between 1 and 2 humanities antonym items are to be included. A substantial proportion of simulees with above average true ability were administered three or four such items.

TABLE 6

Content Constraint Violations - Adaptive Verbal Test

| No | Description | LB[1] | UB[2] | W[3] | N[4] | % in typ grp | avg # items |
|----|-------------|-----|-----|----|----|----------|---------|
| 4 | Humanities Passages | 0 | 1 | 2 | 8 | 3.9 | .49 |
| 7 | Narrative Passages | 0 | 1 | 1 | 9 | 2.3 | .63 |
| 12 | Main idea items | 1 | 4 | 1 | 35 | 1.8 | 1.2 |
| 13 | Explicit statement items | 1 | 4 | 1 | 52 | 25.9 | 1.6 |
| 14 | Inference items | 2 | 5 | 1 | 58 | 6.4 | 2.3 |
| 15 | Other items | 1 | 4 | 1 | 52 | 10.8 | 3.0 |
| 23 | SNCP arts items | 1 | 2 | 3 | 25 | 13.8 | 1.3 |
| 24 | SNCP practical affairs items | 1 | 2 | 3 | 27 | 12.5 | 1.2 |
| 25 | SNCP science items | 1 | 2 | 3 | 21 | 11.4 | 1.4 |
| 26 | SNCP human relations items | 1 | 2 | 3 | 22 | 13.6 | 1.1 |
| 34 | Arts analogies | 1 | 2 | 1 | 20 | 30.2 | 1.8 |
| 35 | Practical affairs analogies | 1 | 2 | 1 | 21 | 1.7 | 1.2 |
| 36 | Science analogies | 1 | 2 | 1 | 26 | 5.2 | 1.4 |
| 37 | Human relations analogies | 1 | 2 | 1 | 18 | 40.0 | 1.6 |
| 38 | Concrete analogies | 1 | 3 | 1 | 24 | 1.5 | 2.1 |
| 40 | Abstract analogies | 1 | 3 | 1 | 30 | 9.8 | 1.8 |
| 43 | Traits analogies | 0 | 1 | 1 | 15 | 4.9 | .6 |
| 48 | Arts antonyms | 1 | 2 | 1 | 30 | 23.8 | 1.5 |
| 49 | Practical affairs antonyms | 1 | 2 | 1 | 30 | 6.4 | 1.8 |
| 50 | Science antonyms | 1 | 2 | 1 | 38 | 28.7 | 2.0 |
| 51 | Human relations antonyms | 1 | 2 | 1 | 43 | 64.7 | 2.6 |
| 52 | Verb antonyms | 1 | 4 | 1 | 36 | .6 | 2.4 |
| 53 | Noun antonyms | 1 | 4 | 1 | 32 | 4.0 | 2.0 |
| 54 | Adjective antonyms | 1 | 4 | 1 | 73 | 18.4 | 3.6 |

[1]Lower Bound;
[2]Upper Bound;
[3]Weight;
[4]Number in Pool possibly disappear, if it were possible to obtain items appropriate for all levels of ability that also had all of the features of interest. This may not be economically feasible.

As a final evaluation of the adaptive test design, 30 adaptive tests were examined by test development specialists, with six tests being assigned at random to each of five specialists. Ten of these tests were drawn randomly from those administered to simulees at the four lowest and six highest ability levels. Twelve of them were drawn randomly from simulees at the five middle ability levels (true scores of 35, 40, 45, 50, and 55) within which about 67% of the typical distribution of abilities lies. The remaining eight tests were drawn randomly from simulees who had particular patterns of content constraint violations.

The test reviews were performed blind, that is, the five test specialists who performed the reviews had no knowledge of the content constraint violations, the specifications for overlap, or the ability levels for which the adaptive tests were appropriate. A number of problems with these sample tests were identified, particularly for tests appropriate for the more extreme ability levels as opposed to those tests appropriate for more typical examinees. This is not surprising given the fact that items in the pool come from conventional tests designed to measure best at middle ability levels, thus the pool is richest in items appropriate for these abilities. All problems were carefully investigated, and none of them could be attributed to the adaptive testing methodology employed. Rather, all problems were identified as stemming from the size, nature and characteristics of the item pool and the specifications for overlap.

REFERENCES

Ackerman, T. (1989, March). An alternative methodology for creating parallel test forms using the IRT information function. Paper presented at the 1989 NCME annual meeting, San Francisco.

Adema, J. J. (1988). A note on solving large-scale zero-one programming problems (Research Report 88-4). Enschede: Department of Education, University of Twente.

Adema, J. J. (1990). Models and algorithms for the construction of achievement tests. The Haag, Netherlands: CIP-gegevens Koninklijke Bibliotheek.

Boekkooi-Timminga, E. (1989). Models for computerized test construction. The Haag, Netherlands: Academisch Boeken Centrum.

Brooke, A., Kendrick, D., & Meeraus, A. (1988). GAMS: A user's guide. Redwood City, Calif.: The Scientific Press.

College Board, (1990). Coordinator's notebook for the Computerized Placement Tests. Princeton, N.J.: Educational Testing Service.

Green, B. F., Bock, R. D., Humphreys, L. G., Linn, R. L., & Reckase, M. D. (1984). Technical guidelines for assessing computerized adaptive tests. Journal of Educational Measurement, 21, 347–360.

Kester, J. G. (1988). Various mathematical programming approaches toward item selection (Report number 3 of the Project "Optimal Item Selection," Arnhem, the Netherlands: CITO.

Kingsbury, G. G., and Zara, A. R. (1991). A comparison of procedures for content-sensitive item selection in computerized adaptive tests. Applied Measurement in Education, 4, 241–261.

Kingsbury, G. G., and Zara, A. R. (1989). Procedures for selecting items for computerized adaptive tests. Applied Measurement in Education, 2, 359–375.

Lord, F. M. (1952). A theory of test scores. Psychometric Monograph, No. 7.

Lord, F. M. (1970). Some test theory for tailored testing. In W. H. Holtzman (Ed.), Computer assisted instruction, testing, and guidance. New York: Harper and Row.

Lord, F. M. (1971a). Robbins-Munro procedures for tailored testing. Educational and psychological measurement, 31, 3–31.

Lord, F. M. (1971b). The self-scoring flexilevel test. Journal of Educational measurement, 8, 147–151.

Lord, F. M. (1977). A broad-range tailored test of verbal ability. Applied Psychological Measurement, 1, 95–100.

Lord, F. M. (1980). Applications of item response theory to practical testing problems. Hillsdale, N.J.: Erlbaum.

Mislevy, R. J. (1984). Estimating latent distributions. Psychometrika, 49, 359–381.

Nemhauser, G. L., & Wolsey, L. A. (1988). Integer and combinatorial optimization. New York, N.Y.: John Wiley & Sons.

Segall, D. O. (1987). ACAP item pools: Analysis and recommendations. San Diego, Calif.: Navy Personnel Research and Development Center.

Stocking, M. L., Swanson, L., & Pearlman, M. (1991). *An Experiment in the Application of an Automated Item Selection Method to Real Data.* (Research Report 91–64). Princeton, N.J.: Educational Testing Service.

Theunissen, T. J. J. M. (1985). Binary programming and test design. *Psychometrika*, 50, 411–420.

Theunissen, T. J. J. M. (1986). Some applications of optimization algorithms in test design and adaptive testing. *Applied Psychological Measurement*, 10, 381–389.

van der Linden, W. J. (1987). Automated test construction using minimax programming. In W. J. van der Linden (Ed.), *IRT-based test construction.* Enschede, The Netherlands: Department of Education, University of Twente.

van der Linden, W. J., & Boekkooi-Timminga, E. (1989). A maximin model for test design with practical constraints. *Psychometrika*, 54, 237–248.

Wainer, H., and Kiely, G. L. (1987). Item clusters and computerized adaptive testing: a case for testlets. *Journal of Educational Measurement*, 24, No. 3, 185–201.

Wainer, H., Dorans, N.J., Flaugher, R., Green, B. F., Mislevy, R. J., Steinberg, L., and Thissen, D. (1990). *Computerized Adaptive Testing: A Primer.* Hillsdale, N.J.: Lawrebce Erlbaum Associates.

Ward, W. C. (1988). The College Board computerized placement tests: *Machine-Mediated Learning*, 2, 217–282.

Weiss, D. J. (1976). Adaptive testing research at Minnesota: Overview, recent results, and future directions. In C. L. Clark (Ed.), *Proceedings of the First Conference on Computerized Adaptive Testing* (pp.24–35). Washington, D.C.: United States Civil Service Commission.

Weiss, D. J. (Ed.) (1978). *Proceedings of the 1977 Computerized Adaptive Testing Conference.* Minneapolis: University of Minnesota.

Wingersky, M. S. (1983). LOGIST: A program for computing maximum likelihood procedures for logistic test models. In R. K. Hambleton (Ed.), *Applications of item response theory.* Vancouver, BC: Educational Research Institute of British Columbia.

Zara, A. R. (1990) A research proposal for field testing CAT for nursing licensure examinations. In *Delegate Assembly Book of Reports* 1989. Chicago: National Council of State Boards of Nursing.

We claim:

1. A computer-implemented method for the adaptive testing of a test-taker implemented on a computer system comprising the steps of:

initializing the computer system by initializing internal variables, loading a stopping rule, loading test constraints and loading a pool of test items;

determining an estimated ability of the test-taker;

calculating a weighted sum of positive deviations from the test constraints for all test items in the pool of test items at the estimated ability of the test-taker;

selecting from the pool a test item at the estimated ability of the test-taker which minimizes the weighted sum of positive deviations from the test constraints;

administering the selected test item to the test-taker in order to solicit a response and scoring the response of the test-taker;

updating a test constraint count for each of the test constraints and the estimated ability of the test-taker;

continuing the selection and administration of test items and updating of test constraint counts and the estimated ability of the test taker until the stopping rule is reached;

recording a final result for the test-taker based on the responses to the selected test items.

2. The method of claim 1 wherein the stopping rule is the administration of a fixed number of test items.

3. The method of claim 1 wherein the stopping rule is the precision of measurement of the estimated ability of the test-taker.

4. A computer-implemented method of adaptively testing a test-taker using a computer system comprising the steps of:

(A) initializing the computer system by initializing internal variables, loading a stopping rule, loading test constraints and loading a pool of test items;

(B) determining an estimated ability of the test-taker;

(C) calculating a weighted sum of positive deviations from the test constraints for each test item in the pool at the estimated ability of the test-taker and selecting from the pool a test item at the estimated ability of the test-taker which minimizes the weighted sum of positive deviations from the test constraints;

(D) repeating step (C) until a subset of n best test items has been generated;

(E) randomly selecting a test item from the subset of n best test items;

(F) administering the randomly selected test item to the test-taker in order to solicit a response and scoring the response of the test-taker to generate a scored response;

(G) updating a count for each of the test constraints which the randomly selected test item satisfies and updating the estimated ability of the test-taker;

(H) repeating steps (C)–(G) until the stopping rule is reached;

(I) outputting to the test-taker a result based on the scored responses of the test-taker to the randomly selected test items.

5. The method of claim 4 wherein the stopping rule is the administration of a fixed number of test items.

6. The method of claim 4 wherein the stopping rule is the precision of measurement of the estimated ability of the test-taker.

7. A computer-implemented method of adaptively testing a test-taker implemented on a computer system comprising the steps of:

(A) initializing the computer system by initializing internal variables, loading a stopping rule, loading test constraints and loading a pool of blocks of test items;

(B) determining an estimated ability of the test-taker;

(C) selecting from the pool a block of test-items from which to select items;

(D) selecting a test item from the selected block of test items which minimizes a weighted sum of positive deviations from the test constraints;

(E) continuing step (D) until a subset of n best test items has been generated;

(F) randomly selecting a test item from the subset of n best test items;

(G) administering the randomly selected test item to the test-taker in order to solicit a response from the test-taker and scoring the response of the test-taker;

(H) updating a count on each of the test constraints and the estimated ability of the test-taker;

(I) continuing the selection of test items from the block of test items until the maximum number of test items from that block of test items has been reached and then setting that block of test items ineligible;

(J) continuing the selection and administration of test items by repeating steps (C)–(I) until the stopping rule is reached;

(K) outputting to the test-taker a result based on the scored responses of the test-taker to the selected test items.

8. A computer-implemented method of adaptively testing a test-taker on a computer comprising the steps of:

(A) initializing the computer;

(B) loading a pool of a plurality of blocks of test items into the computer;

(C) loading a set of test constraints into the computer;

(D) loading a stopping rule into the computer wherein the stopping rule indicates an end of the test;

(E) setting the ability estimate tolerance for the test-taker;

(F) computing a maximum likelihood estimated ability for the test-taker;

(G) locating a set of test-items from the pool of test items based on the maximum likelihood estimated ability for the test-taker;

(H) computing a weighted sum of deviations for each test item in the set of test-items based on deviations from the set of test constraints which would result from selection of the test item;

(I) selecting the test item which minimizes the weighted sum of deviations from the set of test constraints;

(J) administering the selected test item to the test-taker;

(K) updating a count for each test constraint;

(L) updating the estimated ability for the test-taker;

(M) selecting additional items for administration to the test-taker using steps (F)–(L) until the stopping rule is reached.

9. A computer-implemented method of adaptively testing a plurality of test-takers on a computer comprising the steps of:

(A) initializing in the computer a scoring record for a test-taker;

(B) initializing test item selection for the test-taker comprising the steps of:
(i) loading test parameters including a stopping rule into the computer;
(ii) allocating data structures within the computer;
(iii) loading test item constraints into the computer;
(iv) loading test item pool into the computer; and,
(v) initializing internal variables including test item constraint counts and test set constraint counts within the computer;

(C) selecting a next test item, said selecting a next test item comprising the steps of:
(i) setting an ability estimate tolerance for the test-taker;
(ii) computing a maximum likelihood estimated ability with an estimated theta for the test-taker;
(iii) determining if the stopping rule has been reached;
(iv) if the stopping rule has not been reached choosing a next test item to be administered after a prior test item from a block of test items, said choosing a next test item comprising the steps of:
(a) recording the prior test item;
(b) finding a theta position closest to the estimated theta;
(c) setting a test item pool scope based on the current block of test items;
(d) identifying a set of n best test items;
(e) randomly selecting among the set of n best test items; and,
(f) setting a block scope; and,
(v) administering the prior item to the test-taker;

(D) repeating step (C) if the stopping rule has not been reached;

(E) scoring the test; and, (F) outputting the test score to the test-taker.

10. The method of claim 9 in which the prior item recordation step comprises the steps of:
(a) updating the test item constraint counts;
(b) updating the test set constraint counts;
(c) updating test information at each theta;
(d) computing a weighted sum of deviations; and
(e) setting all test items that overlap with the prior test item ineligible.

11. The method of claim 9 in which the step of identifying the set of n best items comprises the steps of:
(a) locating a next eligible test item;
(b) computing a weighted sum of deviations from the test constraints for the next eligible test item;
(c) storing the test item in a stack if it is among the n best test items;
(d) repeating steps (a), (b) and (c) if the test item pool is not exhausted; and
(e) returning the set of n best test items when the test item pool is determined to be exhausted.

12. The method of claim 11 in which the step of computing the weighted sum of deviations comprises the steps of:
(a) computing a positive deviation for each test item constraint;
(b) computing a positive deviation for each test set constraint;
(c) computing a positive deviation at each theta position; and
(d) updating the weighted sum of deviations.

13. The method of claim 12 in which the positive deviation of steps (a), (b) and (c) are computed by the steps of:
(a) computing an expectation;
(b) adding the prior number of test items or test sets meeting the test item constraint or the test set constraint;
(e) returning the weighted difference if the prior number of test items or test sets plus the expectation is less than a lower bound;
(d) returning the weighted difference if the prior number of test items or test sets plus the expectation is greater than an upper bound; and
(e) returning no weighted difference if the prior number of test items or test sets plus the expectation is not less than the lower bound and the prior number of test items or test sets plus the expectation is not greater than the upper bound.

14. The method of claim 13 in which the expectation of step (a) is computed by:
(a) setting the expectation to an average of the test item information in the pool times the number of test items remaining in the test if there is no test item or test set constraint;
(b) setting the expectation to a proportion of test items or test sets in the pool times the number of test items or test sets remaining in the test if there is a test item or test set constraint but the constraint does not apply to the block; and
(c) setting the expectation to a proportion of test items or test sets in the block times the number of test items or test sets remaining in the block if there is a test item or test set constraint and the constraint does apply to the block.

15. The method of claim 14 in which the step of setting the block scope for a block of test items comprises the steps of (a) counting the number of test items used in the block;

(b) declaring the block ineligible if it has been completed; and (c) setting a new block scope when a new block is started.

16. A computerized adaptive test system for the adaptive testing of a test-taker through the administration of a selection of test items to which the test-taker provides a response comprising:

a central processing unit for processing data and instructions;

a memory means for storing data and instructions in communication with the central processing unit;

an input means in communication with the central processing unit for permitting the test-taker to input a response to test items;

an output means in communication with the central processing unit for generating an image to the test-taker;

a secondary storage means for storing a pool of test items, test constraints, at least one stopping rule and test results; and a plurality of computer programs stored in the secondary storage means and transferred to the memory means for execution by the central processing unit, wherein said programs comprise:

a means for generating an estimated ability of the test-taker;

a means for calculating a weighted sum of positive deviations from the test constraints for all test items in the pool of test items at the estimated ability of the test-taker;

a means for selecting from the pool of test items a test item at the estimated ability of the test-taker which minimizes the weighted sum of positive deviations from the test constraints;

a means for outputting the selected test item to the output means;

a means for scoring the response input by the test-taker to the selected test item;

a means for updating a count for each of the test constraints and the estimate of ability of the test-taker;

a means for ending the test upon reaching at least one stopping rule.

17. The computerized adaptive testing system of claim 16 wherein the input means is a keyboard and the output means is a computer monitor.

18. The computerized adaptive testing system of claim 17 further comprising a means for scoring the responses to the adaptive test and for outputting to the output means a final test-result for the test-taker.

19. A system for adaptively testing a plurality of test-takers comprising:

a central processing unit for processing data and instructions;

a memory means for storing data and instructions connected to the central processing unit;

an input means connected to the central processing unit for the input of a response of the test-taker;

a display means connected to the central processing unit for generating an image to display test questions and test results to the test-taker;

a secondary storage means connected to the memory means for storing a test item pool, a set of test constraints, at least one stopping rule and test results; and, a computer program stored in the secondary storage means and transferred to the memory means for execution by the central processing unit, wherein said program comprises:

a means for generating an estimated ability of the test-taker;

a means for calculating a weighted sum of deviations from the set of test constraints for all test items in the test item pool at the estimated ability of the test-taker and for selecting from the test item pool a subset of n test items at the estimated ability of the test-taker which minimizes the weighted sum of positive deviations from the test constraints;

a means for randomly selecting a test item from the subset of n test items;

a means for administering the selected test item to the test-taker through the display means;

a means for scoring the response of the test-taker input through the input means;

a means for updating a count for each test constraint which the selected test item satisfies and updating the estimate of ability of the test-taker;

a means for calculating the final result based on the responses of the test-taker and outputting the result to the test-taker through the display means.

* * * * *